US012259680B2

(12) United States Patent
Sato et al.

(10) Patent No.: US 12,259,680 B2
(45) Date of Patent: Mar. 25, 2025

(54) IMAGE FORMING APPARATUS

(71) Applicant: BROTHER KOGYO KABUSHIKI KAISHA, Nagoya (JP)

(72) Inventors: Shougo Sato, Seto (JP); Yasuo Fukamachi, Aichi (JP); Motoaki Mushika, Hashima (JP); Kazuna Taguchi, Aichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/485,898

(22) Filed: Oct. 12, 2023

(65) Prior Publication Data

US 2024/0036514 A1 Feb. 1, 2024

Related U.S. Application Data

(63) Continuation of application No. 17/674,256, filed on Feb. 17, 2022, now Pat. No. 11,815,846, which is a (Continued)

(30) Foreign Application Priority Data

Nov. 30, 2015 (JP) ................................ 2015-232862

(51) Int. Cl.
*G03G 21/18* (2006.01)
*G03G 15/08* (2006.01)

(52) U.S. Cl.
CPC ..... *G03G 21/1842* (2013.01); *G03G 15/0896* (2013.01); *G03G 21/1814* (2013.01); *G03G 21/1821* (2013.01)

(58) Field of Classification Search
CPC ........... G03G 21/1842; G03G 21/1846; G03G 21/1853
See application file for complete search history.

(56) References Cited

U.S. PATENT DOCUMENTS

| | | | |
|---|---|---|---|
| 8,010,014 | B2 | 8/2011 | Noguchi |
| 2003/0053819 | A1 | 3/2003 | Nomura et al. |

(Continued)

FOREIGN PATENT DOCUMENTS

| | | | |
|---|---|---|---|
| JP | 11-174933 | A | 7/1999 |
| JP | 2005-134483 | A | 5/2005 |

(Continued)

OTHER PUBLICATIONS

Related U.S. Appl. No. 15/370,809, filed Dec. 6, 2016.

(Continued)

*Primary Examiner* — Erika J. Villaluna
(74) *Attorney, Agent, or Firm* — Merchant & Gould P.C.

(57) ABSTRACT

An image forming apparatus, including a process cartridge and a main body with an opening and a cartridge supporter is provided. The process cartridge includes a drum cartridge; a toner cartridge attachable to the drum cartridge; and a switching member switchable states in the process cartridge between a first state, wherein detachment of the toner cartridge is restricted, and a second state, wherein the toner cartridge is released from the restriction. The cartridge supporter is movable between a first position, wherein the cartridge supporter supports the process cartridge to be placed entirely in an inner space in the main body on an inner side of the opening, and a second position, wherein the cartridge supporter supports the process cartridge to be at least partly placed outside the inner space. When the cartridge supporter is in the second position, the switching member is at least partly placed outside the inner space.

10 Claims, 12 Drawing Sheets

Related U.S. Application Data continuation of application No. 17/104,204, filed on Nov. 25, 2020, now Pat. No. 11,314,200, which is a continuation of application No. 16/773,296, filed on Jan. 27, 2020, now Pat. No. 10,859,967, which is a continuation of application No. 16/014,538, filed on Jun. 21, 2018, now Pat. No. 10,571,856, which is a continuation of application No. 15/364,996, filed on Nov. 30, 2016, now Pat. No. 10,031,474.

(56) References Cited

U.S. PATENT DOCUMENTS

| | | | |
|---|---|---|---|
| 2005/0191090 | A1 | 9/2005 | Nishimura |
| 2006/0067734 | A1 | 3/2006 | Igarashi et al. |
| 2006/0251446 | A1 | 11/2006 | Okabe et al. |
| 2009/0180802 | A1 | 7/2009 | Sato et al. |
| 2010/0080617 | A1 | 4/2010 | Noguchi |
| 2011/0064463 | A1 | 3/2011 | Hashimoto et al. |
| 2011/0182612 | A1 | 7/2011 | Kamimura et al. |
| 2011/0217075 | A1 | 9/2011 | Uehara et al. |
| 2011/0236055 | A1 | 9/2011 | Mori et al. |
| 2011/0311269 | A1 | 12/2011 | Murooka |
| 2013/0016995 | A1 | 1/2013 | Hiramatsu et al. |
| 2013/0051851 | A1 | 2/2013 | Fukamachi |
| 2015/0050042 | A1 | 2/2015 | Sato et al. |
| 2015/0050059 | A1 | 2/2015 | Sato et al. |
| 2015/0261173 | A1 | 9/2015 | Sato |
| 2015/0261179 | A1 | 9/2015 | Sato et al. |
| 2015/0277368 | A1 | 10/2015 | Nishiyama et al. |
| 2016/0041519 | A1 | 2/2016 | Sato |
| 2017/0031275 | A1 | 2/2017 | Ohkubo et al. |
| 2017/0160697 | A1 | 6/2017 | Sato et al. |
| 2017/0219995 | A1 | 8/2017 | Sato et al. |

FOREIGN PATENT DOCUMENTS

| | | | |
|---|---|---|---|
| JP | 2006-58350 | A | 3/2006 |
| JP | 2010-102321 | A | 5/2010 |
| JP | 2013-20112 | A | 1/2013 |

OTHER PUBLICATIONS

U.S. Office Action issued in related U.S. Appl. No. 15/370,809, mailed Jan. 16, 2018.

Office Action (Notice of Allowance) issued in related U.S. Appl. No. 16/137,158, Jan. 17, 2019.

Office Action (Notice of Reasons for Refusal) issued in related Japanese Patent Application No. 2019-224042, Dec. 1, 2020.

Non-final Office Action issued in related U.S. Appl. No. 17/321,751, Feb. 25, 2022.

Kawaguchi, JP 11-174933 A, Jul. 1999, WIPO Computer Translation (Year: 1999).

IMAGE FORMING APPARATUS

REFERENCE TO RELATED APPLICATIONS

This application is a Continuation of U.S. patent application Ser. No. 17/674,256, filed Feb. 17, 2022, now U.S. Pat. No. 11,815,846, which is a Continuation of U.S. patent application Ser. No. 17/104,204, filed Nov. 25, 2020, now U.S. Pat. No. 11,314,200, which is a Continuation of U.S. patent application Ser. No. 16/773,296, filed Jan. 27, 2020, now U.S. Pat. No. 10,859,967 issued Dec. 8, 2020, which is a Continuation of U.S. patent application Ser. No. 16/014,538, filed Jun. 21, 2018, now U.S. Pat. No. 10,571,856 issued Feb. 25, 2020, which is a Continuation of U.S. patent application Ser. No. 15/364,996, filed on Nov. 30, 2016, now U.S. Pat. No. 10,031,474 issued Jul. 24, 2018, which claims priority under 35 U.S.C. § 119 from Japanese Patent Application No. 2015-232862, filed on Nov. 30, 2015. The entire subject matters of these applications are incorporated herein by reference.

BACKGROUND ART

Technical Field

The following description is related to an aspect of an image forming apparatus capable of forming images in an electro-photographic style.

Background

An image forming apparatus, having a process cartridge that contains toner therein and includes a photosensitive drum and a developer roller, for forming images in an electro-photographic style is known.

For example, an image forming apparatus formed to have a loadable space, in which a process cartridge is removably installed, is known.

The image forming apparatus may be equipped with a holder to hold the process cartridge and a movable cover to cover or uncover an opening formed in the image forming apparatus. The holder may be movable in conjunction with the cover so that, when the cover is opened, the process cartridge held by the holder may be moved out of the loadable space to the opening of the image forming apparatus.

The process cartridge moved to the opening may be detached from the holder so that the process cartridge may be replaced with another process cartridge.

DESCRIPTION

Summary

Meanwhile, a process cartridge having a drum cartridge and a toner cartridge that are separable from one another may be employed in an image forming apparatus.

When an image forming apparatus employs such a process cartridge with the separable drum cartridge and toner cartridge, the toner cartridge alone may be detached from or attached to the drum cartridge for replacement while the process cartridge is maintained held by the holder.

In this regard, there may be a demand that the toner cartridges might be replaced smoothly while the process cartridge is held stably by the holder.

The present disclosure is advantageous in that an image forming apparatus, in which a toner cartridge is detachable from and attachable to a drum cartridge for replacement while the process cartridge is maintained supported by a cartridge supporter, is provided.

According to an aspect of the present disclosure, an image forming apparatus having a process cartridge and a main body is provided. The process cartridge includes a drum cartridge including a photosensitive drum; a toner cartridge detachably attachable to the drum cartridge; and a switching member. The switching member is configured to switch states in the process cartridge, while the toner cartridge is attached to the drum cartridge, between a first state, in which the toner cartridge is restricted from being detached from the drum cartridge, and a second state, in which the toner cartridge is released to be detachable from the drum cartridge. The main body has an opening and a cartridge accommodating portion, to which the process cartridge is detachably attached through the opening. The main body includes a cartridge supporter, which is movable between a first position, in which the cartridge supporter supports the process cartridge to be placed entirely in an inner space formed inside the main body on an inner side with respect the opening, and a second position, in which the cartridge supporter supports the process cartridge to be placed at least partly outside the inner space of the main body on an outer side with respect the opening. When the cartridge supporter is in the second position, at least a part of the switching member is placed outside the inner space of the main body on the outer side with respect the opening.

According to another aspect of the present disclosure, an image forming apparatus including a process cartridge and a main body is provided. The process cartridge includes a developer cartridge to accommodate toner and a drum cartridge, to which the developer cartridge is detachably attachable. The drum cartridge includes a photosensitive drum; a pair of the side walls supporting the photosensitive drum; a shaft supported by one of the pair of side walls; and an operable lever connected with the shaft. The operable lever is movable between a restrictive position, in which the developer cartridge is restricted from being detached from the drum cartridge, and a releasable position, in which the developer cartridge is released to be detachable from the drum cartridge. The main body has an opening and a cartridge accommodating portion, to which the process cartridge is detachably attachable through the opening. The main body includes a cartridge supporter, which is movable between a first position, in which the cartridge supporter supports the process cartridge to be placed entirely in an inner space formed inside the main body on an inner side with respect the opening, and a second position, in which the cartridge supporter supports the process cartridge to be placed at least partly outside the inner space of the main body on an outer side with respect the opening. When the cartridge supporter is in the second position, at least a part of the operable lever is placed outside the inner space of the main body on the outer side with respect the opening.

According to still another aspect of the present disclosure, an image forming apparatus having a process cartridge and a main body is provided. The process cartridge includes a drum cartridge including a photosensitive drum; a developer cartridge detachably attachable to the drum cartridge: and an operable lever provided on one of the drum cartridge and the developer cartridge. The operable lever is movable between a restrictive position, in which the developer cartridge is restricted from being detached from the drum cartridge, and a releasable position, in which the developer cartridge is released to be detachable from the drum cartridge. The main body has an opening and a cartridge accommodating portion, to which the process cartridge is detachably attachable through the opening. The main body includes a cartridge supporter, which is movable between a first position, in which the cartridge supporter supports the process cartridge to be placed entirely in an inner space formed inside the main body on an inner side with respect the opening, and a second position, in which the cartridge supporter supports the process cartridge to be placed at least partly outside the inner space of the main body on an outer side with respect the opening. When the cartridge supporter is in the second position, at least a part of the operable lever is placed outside the inner space of the main body on the outer side with respect the opening.

According to still another aspect of the present disclosure, an image forming apparatus having a process cartridge and a main body is provided. The process cartridge includes a drum cartridge including a photosensitive drum; and a toner cartridge detachably attachable to the drum cartridge. The toner cartridge includes a container cylinder having a first toner-opening, an outer cylinder arranged on an outer circumference of the container cylinder, and an operable lever provided on the outer cylinder. The outer cylinder has a second toner-opening. The outer cylinder is movable between a first cylinder position, in which the first toner-opening and the second toner-opening communicate, and a second cylinder position, in which the outer cylinder covers the first toner-opening. The main body has an opening and a cartridge accommodating portion, to which the process cartridge is detachably attachable through the opening. The main body includes a cartridge supporter, which is movable between a first position, in which the cartridge supporter supports the process cartridge to be placed entirely in an inner space formed inside the main body on an inner side with respect the opening, and a second position, in which the cartridge supporter supports the process cartridge to be placed at least partly outside the inner space of the main body on an outer side with respect the opening. When the cartridge supporter is in the second position, at least a part of the operable lever is placed outside the inner space of the main body on the outer side with respect the opening.

Figure 1:
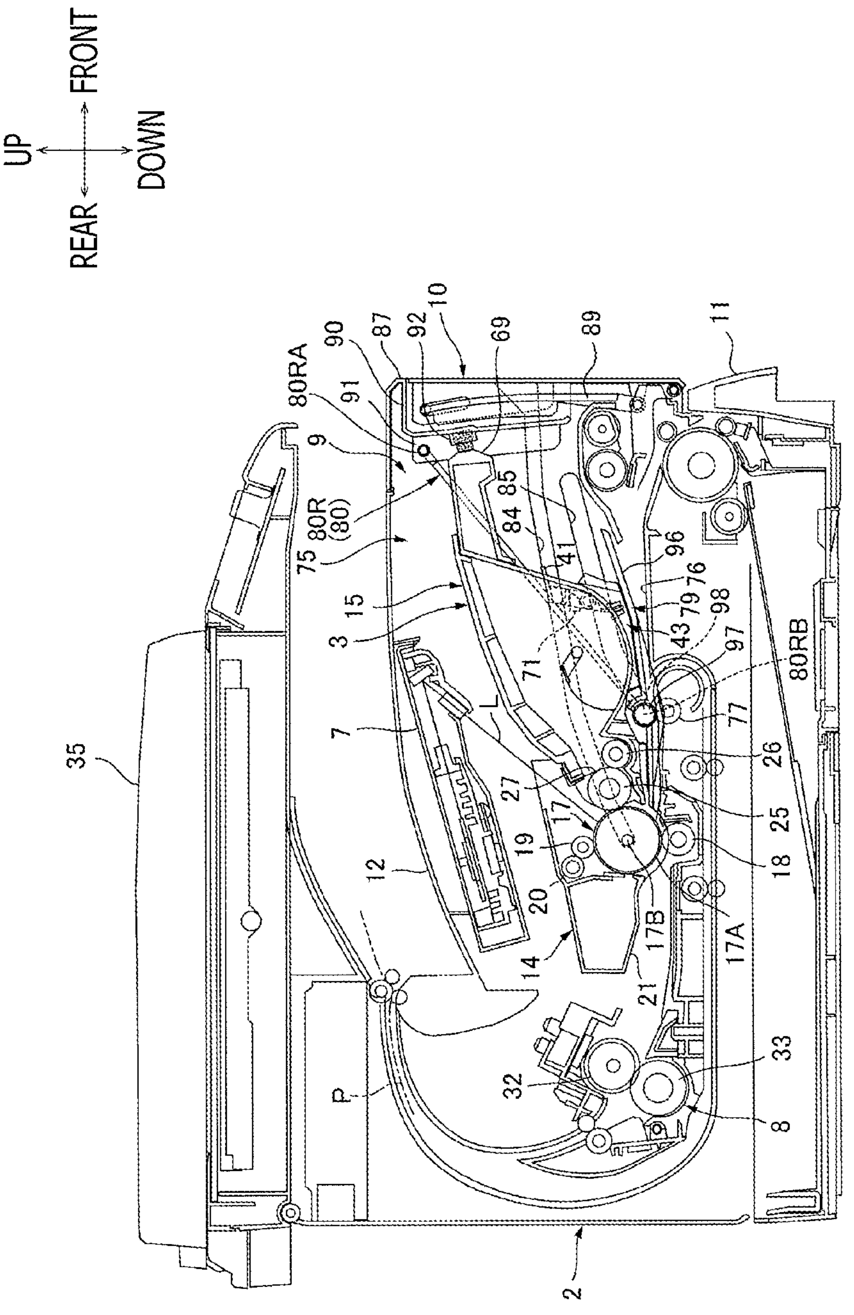
FIG. 1 is a cross-sectional view of an image forming apparatus according to a first exemplary embodiment of the present disclosure.

Hereinafter, an image forming apparatus 1 according to exemplary embodiments of the present disclosure will be described with reference to the accompanying drawings. In the following description, directions related to the image forming apparatus 1 will be cited with reference to arrows shown in the drawings. For example, in FIG. 1, a viewer's upward, downward, rightward, and leftward directions will be referred to as upward, downward, frontward, and rearward directions in the image forming apparatus 1, respectively. An up-to-down or down-to-up direction may be referred to as a vertical direction, and a front-to-rear or rear-to-front direction may be referred to as a front-rear direction. Further, a left-to-right or right-to-left direction may be referred to as a widthwise direction.

1. OVERALL CONFIGURATION OF THE IMAGE FORMING APPARATUS

The image forming apparatus 1 shown in FIG. 1 is a monochrome printer for forming images in an electrophotographic style. The image forming apparatus 1 includes a main body 2 formed to have an opening 9, a process cartridge 3, a scanner unit 7, a transfer roller 18, a fuser unit 8, and a reader unit 35.

The main body 2 is formed in an approximate shape of a box and includes a cover 10, a sheet-feeder tray 11, and a sheet-ejection tray 12.

The opening 9 is formed in a frontend part of the main body 2 to allow communication between inside and outside of the main body 2. The opening 9 is in a form to allow the process cartridge 3 to pass there-through.

The cover 10 is located in a frontend area of the main body 2. The cover 10 is formed to have an approximate shape of a plate and may be arranged to spread vertically. The cover 10 is swingably supported at a lower end thereof by the frontend part of the main body 2. The cover 10 is swingably movable between a closing position (FIG. 1) to close the opening 9 and an open position (see FIG. 5) to expose the opening 9.

The sheet-feeder tray 11 is located in a lower end area of the main body 2. The sheet-feeder tray 11 may store one or more sheets P therein.

The sheet-ejection tray 12 is located in an approximately central area with regard to the front-rear direction in an upper area of the main body 2. The sheet-ejection tray 12 is formed on an upper surface of the main body 2 to deepen downward so that the ejected sheets P may be placed thereon.

The process cartridge 3 is detachably attachable to the main body 2. The process cartridge 3 is located in an approximately vertically central area in the main body 2. The process cartridge 3 is located at an upper position with respect to the sheet-feeder tray 11 and at a lower position with respect to the sheet-ejection tray 12. The process cartridge 3 includes a drum cartridge 14 and a developer cartridge 15.

The drum cartridge 14 includes a photosensitive drum 17, a charger roller 19, a charger-cleaning roller 20, and a drum-cleaning unit 21. The charger roller 17 may charge a surface of the photosensitive drum 17. The charger-cleaning roller 20 may remove waste materials such as residual toner and/or paper dust adhered to the surface of the charger roller 19. The drum-cleaning unit 21 may collect and store waste materials adhered to the photosensitive drum 17.

The photosensitive drum 17 is located in a rear end area in the drum cartridge 14. The photosensitive drum 17 is formed to have an approximate shape of a cylinder axially extending in the widthwise direction.

The developer cartridge 15 is detachably attachable to the drum cartridge 14. The developer cartridge 15 is located frontward with respect to the photosensitive drum 17. The developer cartridge 15 may store toner therein. The developer cartridge 15 includes a developer roller 25, a supplier roller 26, and a spreader blade 27.

The developer roller 25 is located in a rear end area in the developer cartridge 15. The developer roller 25 is arranged to contact the surface of the photosensitive drum 17 and is rotatable.

The supplier roller 26 is located frontward with respect to the developer roller 25. The supplier roller 26 is arranged to contact the surface of the photosensitive drum 17 and is rotatable.

The spreader blade 27 is located frontward with respect to the developer roller 25. The spreader blade 27 is in an arrangement such that a lower end thereof is located at an upper position with respect to the supplier roller 26 and contacts a surface of the developer roller 25.

The scanner unit 7 is located at an upper position with respect to the process cartridge 3. The scanner unit 7 may emit a laser beam L at the photosensitive drum 17 based on image data.

The transfer roller 18 is located at a lower position with respect to the photosensitive drum 17 and contacts the photosensitive drum 17.

The fuser unit 8 is located rearward with respect to the process cartridge 3. The fuser unit 8 includes a heat roller 21 and a pressure roller 33 arranged to contact the heat roller 32.

The reader unit 35 is located at an upper position with respect to the main body 2. The reader unit 35 is arranged at an upper and spaced-apart position from the sheet-ejection tray 12. The reader unit 35 may be a flatbed-typed image scanner. The reader unit 35 may read imaging information concerning an original document.

The image forming apparatus 1 may start an image forming action under control of a controller, which is not shown. As the image forming action starts, the charger roller 19 electrically charges the surface of the photosensitive drum 17 evenly. Meanwhile, the scanner unit 7 emits the laser beam L at the photosensitive drum 17 to expose the surface of the photosensitive drum 17 selectively based on the image data. Thereby, an electrostatic latent image based on the image data is formed on the surface of the photosensitive drum 17.

The supplier roller 26 supplies the toner in the developer cartridge 15 to the developer roller 25. The toner to be supplied to the developer roller 25 is positively charged by friction between the developer roller 25 and the supplier roller 26. The developer roller 25 carries the positively charged toner on the surface thereof. The spreader blade 27 spreads the toner carried on the surface of the developer roller 25 to flatten the toner evenly and restrict thickness of the toner on the surface of the developer roller 25.

The toner carried on the developer roller 25 is supplied to the electrostatic latent image on the surface of the photosensitive drum 17. Thus, a toner image is formed and carried on the surface of the photosensitive drum 17.

Meanwhile, the sheets P are fed from the sheet-feeder tray 11 one-by-one at predetermined timings to be conveyed to a position between the photosensitive drum 17 and the transfer roller 18. The toner image formed on the surface of the photosensitive drum 17 is transferred to the sheet P as the sheet P passes through the position between the photosensitive drum 17 and the transfer roller 18.

Thereafter, the sheet P is conveyed to pass through a position between the heat roller 32 and the pressure roller 33 so that the sheet P is heated and pressed by the heat roller 32 and the pressure roller 33. Thus, the toner image on the sheet P is fused and thermally fixed thereon.

The sheet P is thereafter ejected at the sheet-ejection tray 12.

2. DRUM CARTRIDGE

Figure 2A:
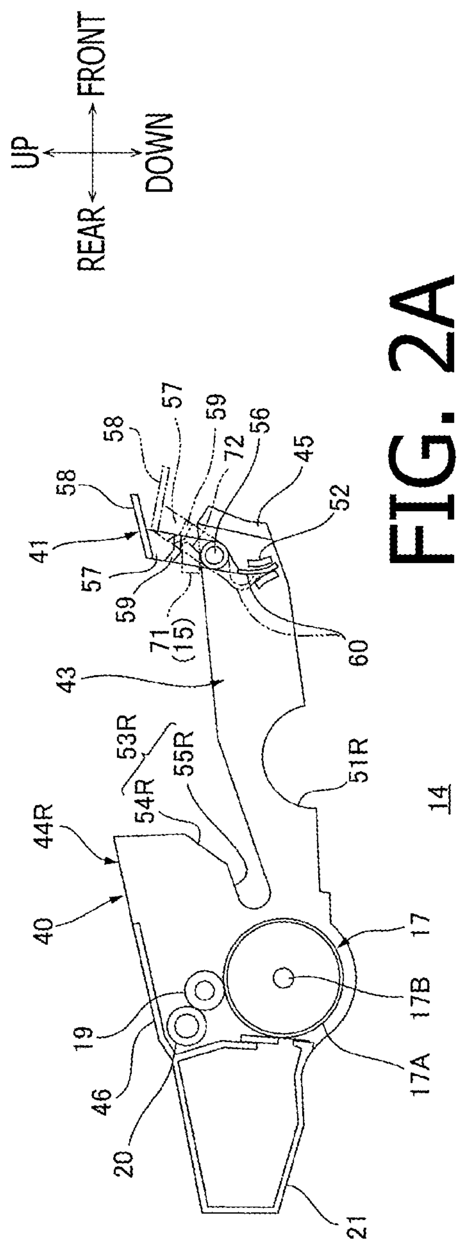
FIG. 2A is a cross-sectional view of a drum cartridge in the image forming apparatus according to the first exemplary embodiment of the present disclosure.
Figure 2B:
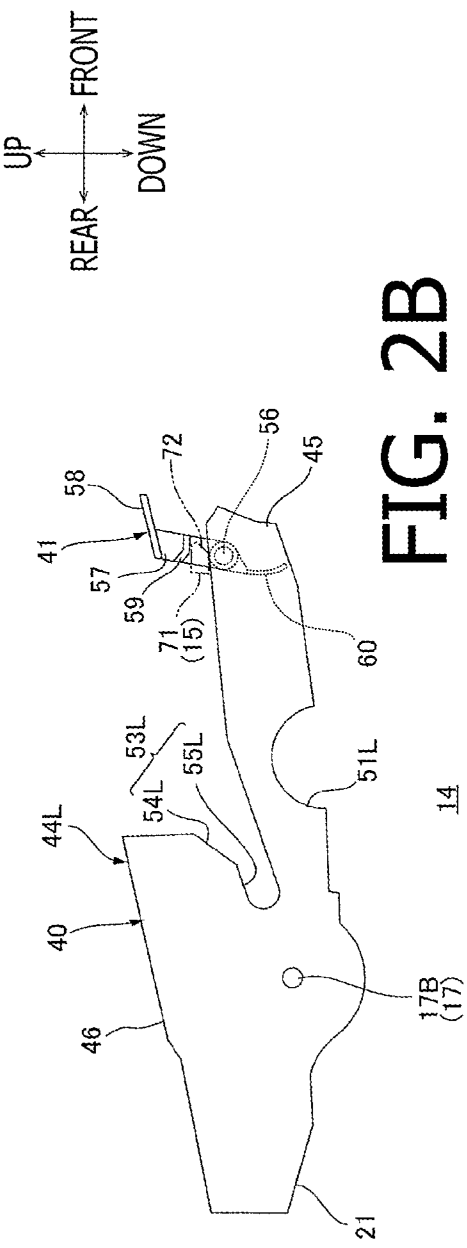
FIG. 2B is a side view of the drum cartridge in the image forming apparatus according to the first exemplary embodiment of the present disclosure.

The drum cartridge 14 includes, as shown in FIGS. 2A and 2B, a drum frame 40 to support the photosensitive drum 17 and a switching member 41.

2-1. Drum Frame

The drum frame 40 includes a side wall 44R on the right, a side wall 44L on the left, a front wall 45, and an upper wall 46. The side wall 44R on the right includes a concave part 51R and a groove 53R, and the side wall 44L on the left includes a concave part 51L and a groove 53L.

The side wall 44R is located at, as shown in FIG. 2A, a rightward end of the drum frame 40. The side wall R is formed to have a plate-like shape arranged to spread in the front-rear and vertical directions. The side wall 44R includes a stopper 52.

The stopper 52 is located in a frontend area in the side wall 44R. The stopper 52 is arranged to project inward along the widthwise direction from a widthwise inner surface of the side wall 44R. The stopper 52 includes a pair of plate-like pieces arranged face each other along the front-rear direction.

The concave part 51R is located in an approximately central area with regard to the front-rear direction and at a lower end of the side wall 44R. The concave part 51R is formed to have a shape of a semicircle in a sideward view along the widthwise direction to dent upward from a lower edge of the side wall 44R.

The groove 53R is located in an approximately central area with regard to the front-rear direction in the side wall 44R. The groove 53R is formed to extend in the front-rear direction and is open frontward. The groove 53R is located frontward with respect to the photosensitive drum 17. The groove 53R includes a wider section 54R and a narrower section 55R.

The wider section 54R is located frontward in the groove 53R. The wider section 54 is formed to be smaller in height toward the rear side of the drum frame 40.

The narrower section 55R is formed to extend continuously from a rear end of the wider section 54R to extend rearward. A height of the narrower section 55R may be constant.

The side wall 44L is, as shown in FIG. 2B, located at a leftward end of the drum frame 40. The side wall 44L is formed in the similar but symmetrical shape to the side wall 44R.

The front wall 45 is, as shown in FIG. 2A, located at a frontend of the drum frame 40 to extend between a frontend of the side wall 44R and a frontend of the side wall 44L. The front wall 45 is formed to have a plate-like shape arranged to spread in the widthwise and vertical directions.

The upper wall 46 is located in an upper end area in the drum frame 40 between an upper end of the side wall 44R and an upper end of the side wall 44L. The upper wall 46 is arranged to spread in the widthwise and front-rear directions. The upper wall 46 vertically overlaps the photosensitive drum 17, the charger roller 19, and the charger-cleaning roller 20.

In the drum frame 40, a frontward area with respect to the photosensitive drum 17 forms a developer-cartridge mount 43, in which the developer cartridge 15 may be loaded to be attached to the drum cartridge 14.

2-2. Switching Member

The switching member 41 may switch states in the process cartridge 3, when the developer cartridge 15 is loaded in the developer-cartridge mount 43, between a state, in which the developer cartridge 15 is attached to the drum cartridge 14 and is restricted from being detached from the drum cartridge 14, and a state, in which the developer cartridge 15 is released from the restriction and detachable from the drum cartridge 14. The switching member 41 is located in a frontend area in the drum cartridge 14. The switching member 41 is pivotable between a restrictive position, which is indicated in solid lines in FIG. 2A, and a releasable position, which is indicated in dash-and-dots lines in FIG. 2A. The following description concerning the switching member 41 is, unless otherwise noted, based on a basic condition of the switching member 41 being in the restrictive position. The switching member 41 includes a shaft 56, an operable lever 58, a connector 57, a projection 59, and a flexible part 60.

The shaft 56 is formed to have a cylindrical shape axially extending in the widthwise direction. The shaft 56 is rotatably supported by a frontend part of the side wall 44R.

The operable lever 58 is located in an upper end area in the switching member 41. The operable lever 58 may be operated by a user to move the switching member 41 from the restrictive position to the releasable position. The operable lever 58 is formed to have a plate-like shape arranged to spread in the widthwise and front-rear directions.

The connector 57 is formed to connect the shaft 56 with the operable lever 58. The connector is formed to have a shape of a plate-like piece arranged to spread in the widthwise and front-rear directions.

The projection 59 is located between the shaft 56 and the operable lever 58. The projection 59 is arranged to project inward along the widthwise direction from a widthwise inner surface of the connector 57. The projection 59 is formed to have a plate-like shape spreading in the front-rear and widthwise directions. The projection 59 is formed to bend upper-rearward at a rear part thereof.

The flexible part 60 is formed to extend downward from a lower end of the shaft 56. The flexible part 60 is formed to have a rod-like shape and is arranged between the paired plate-like pieces in the stopper 52 in the side wall 44R.

2-3. Photosensitive Drum

Figure 4:
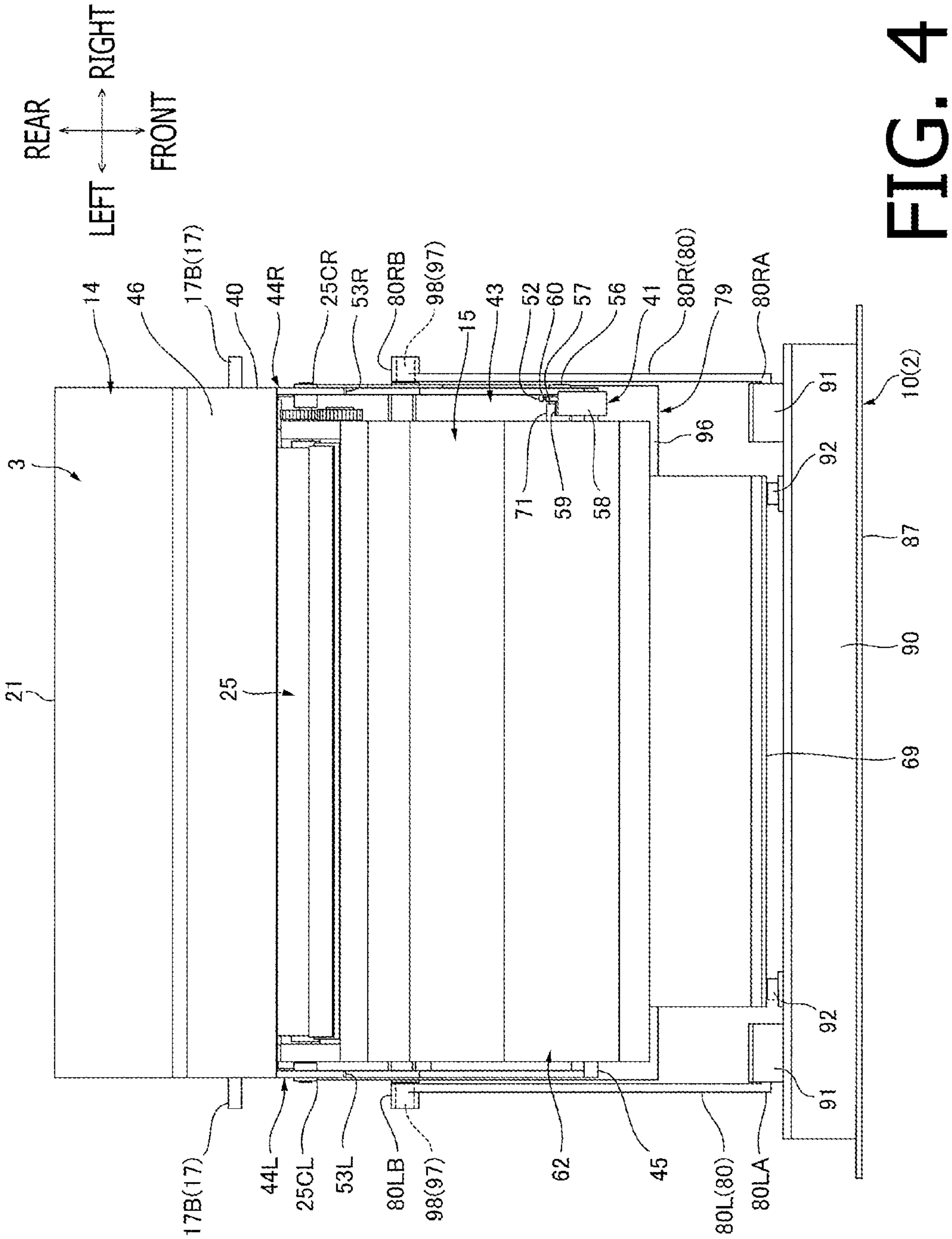
FIG. 4 is a plan view of the process cartridge supported by the cartridge supporter in the image forming apparatus according to the first exemplary embodiment of the present disclosure.

The photosensitive drum 17 includes a drum body 17A and a drum shaft 17B. The drum body 17A is formed to have a cylindrical shape axially extending in the widthwise direction. The drum shaft 17B is located at a radially central position, i.e., on an axis, of the drum body 17A and is formed to have a cylindrical shape axially extending in the widthwise direction. The drum body 17A is rotatably supported at a rightward end thereof by the side wall 44R and at a leftward end thereof by the side wall 44L. As shown in FIG. 4, the drum shaft 17B protrudes rightward from the side wall 44R and leftward at a leftward end part thereof from the side wall 44L.

3. DEVELOPER CARTRIDGE

Figure 3A:
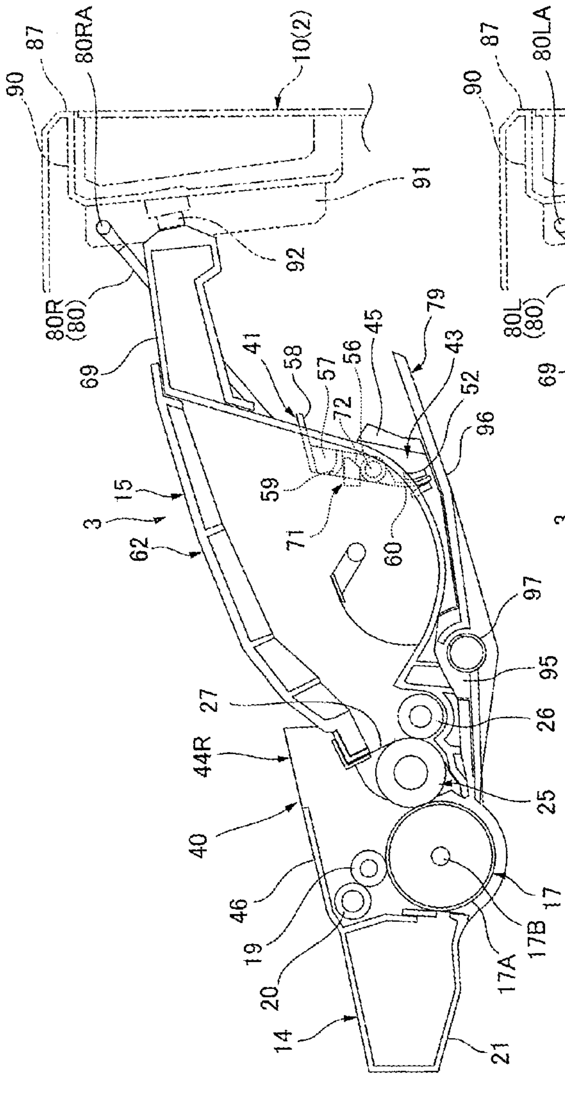
FIG. 3A is a cross-sectional view of a process cartridge supported by a cartridge supporter in the image forming apparatus according to the first exemplary embodiment of the present disclosure.
Figure 3B:
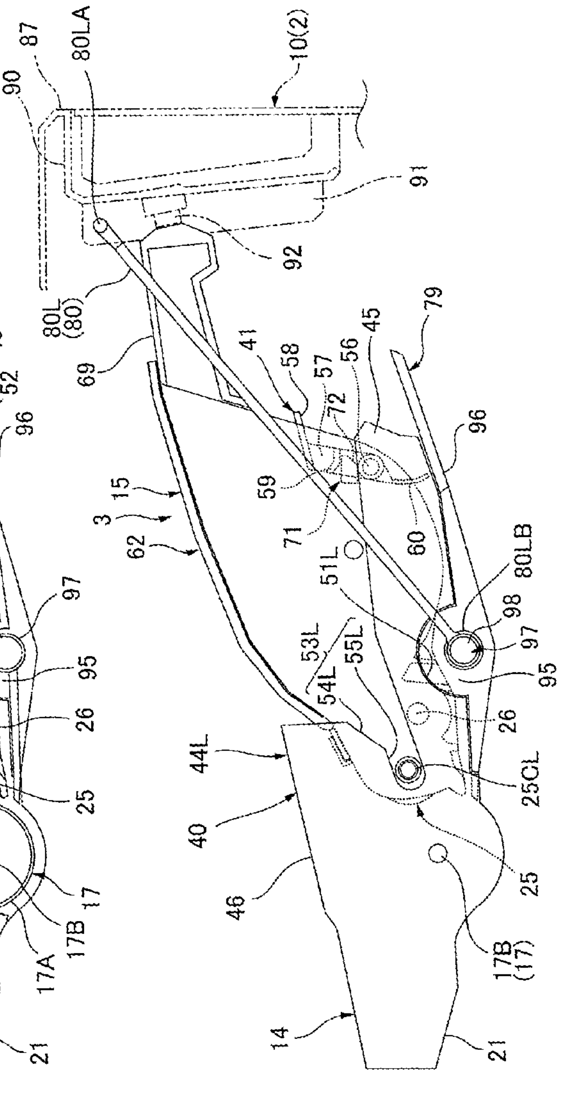
FIG. 3B is a side view of the process cartridge supported by the cartridge supporter in the image forming apparatus according to the first exemplary embodiment of the present disclosure.

The developer cartridge 15 includes, as shown in FIGS. 3A-3B, a frame 62 to support the developer roller 25 and the supplier roller 26, and a handle 69.

3-1. Frame and Handle

The frame 62 may have an approximate shape of a box and includes a projection 71.

The projection 71 is located in a frontend area in the frame 62. The projection 62 is formed to have an approximate shape of a four-sided block arranged to project rightward from a rightward surface of the frame 62. The projection 71 includes a slant surface 72.

The slant surface 72 is formed at a front end in of the projection 71. The slant surface 72 extends from a lower end of the projection 71 to incline upper-frontward, or from an upper end of the projection 71 to incline lower-rearward.

The handle 69 is located in a frontend area in the developer cartridge 15. The handle 69 extends frontward continuously from an upper part of the frame 62. The handle 69 is, as shown in FIG. 4, formed to have an approximate shape of a rectangular bar longitudinally extends in the widthwise direction. A widthwise dimension of the handle 69 is smaller than a widthwise dimension of the frame 62. The handle 69 is, when the developer cartridge 15 is attached to the main body 2 as shown in FIG. 1, at least partly located frontward with respect to a front end of a cartridge supporter 79, which will be described later.

3-2. Developer Roller

The developer roller 25 is formed to have a cylindrical shape and is arranged to axially extend in the widthwise direction. The developer roller 25 is rotatably supported by the frame 62. The developer roller 25 includes, as shown in FIG. 4, a developer collar 25CR on the right and a developer collar CL on the left.

The developer collar 25CR is located on a rightward end of the developer roller 25 at a rightward position with respect to the frame 62. The developer collar 25CR is formed to have a cylindrical shape and arranged to axially extend in the widthwise direction. The developer collar 25CR is arranged to fit on a rightward end of a shaft (unsigned) of the developer roller 25 and is placed to fit in the narrower part 55R in the groove 53R.

The developer collar 25CL is, as shown in FIGS. 3B and 4, located on a leftward end of the developer roller 25 at a leftward position with respect to the frame 62. The developer collar 25CL is formed to have a cylindrical shape and arranged to axially extend in the widthwise direction. The developer collar 25CL is arranged to fit on a leftward end of the shaft of the developer roller 25 and is placed to fit in the narrower part 55L of the groove 53L.

The developer roller 25 is located frontward with respect to the photosensitive drum 17 to contact the photosensitive drum 17.

3-3. Conditions of the Developer Cartridge in the Drum Cartridge

The developer cartridge 15 is, as shown in FIGS. 3A-3B, attachable to the developer-cartridge mount 43 in the drum cartridge 14.

In the drum cartridge 14, when the switching member 41 is in the restrictive position, the projection 71 in the frame 62 is placed to fit vertically between the shaft 56 of the switching member 41 and the projection 59. With the projection 71 being fitted with the shaft 56 and the projection 59, the frontend part of the frame 62 is restricted from being moved vertically.

Further, while the projection 71 fits with the shaft 56 and the projection 59, the front wall 45 of the drum frame 40 is placed frontward with respect to the frame 62. Therefore, the developer cartridge 15 is restricted from moving frontward by the front wall 45.

Thus, when the switching member 41 in the drum cartridge 14 is in the restrictive position, the projection 71 of the frame 62 engages with the projection 59 in the switching member 41 so that the developer cartridge 15 is restricted from being detached from the drum cartridge 14.

Therefore, the developer cartridge 15 may be loaded in the developer-cartridge mount 43 to be attached to the drum cartridge 14 and may be restricted from being removed from the developer cartridge 15.

On the other hand, when the switching member 41 in the drum cartridge 14 is in the releasable position as indicated in the dash-and-dots lines in FIG. 2A, the projection 71 in the frame 62 does not fit in the position between the shaft 56 and the projection 59 in the switching member 41 but is located at an upper position with respect to the shaft 56.

Therefore, the developer cartridge 15 may be released from the restriction from the switching member 41 and allowed to be removed from the drum cartridge 14.

4. DETAILED DESCRIPTION OF THE MAIN BODY

Figure 5:
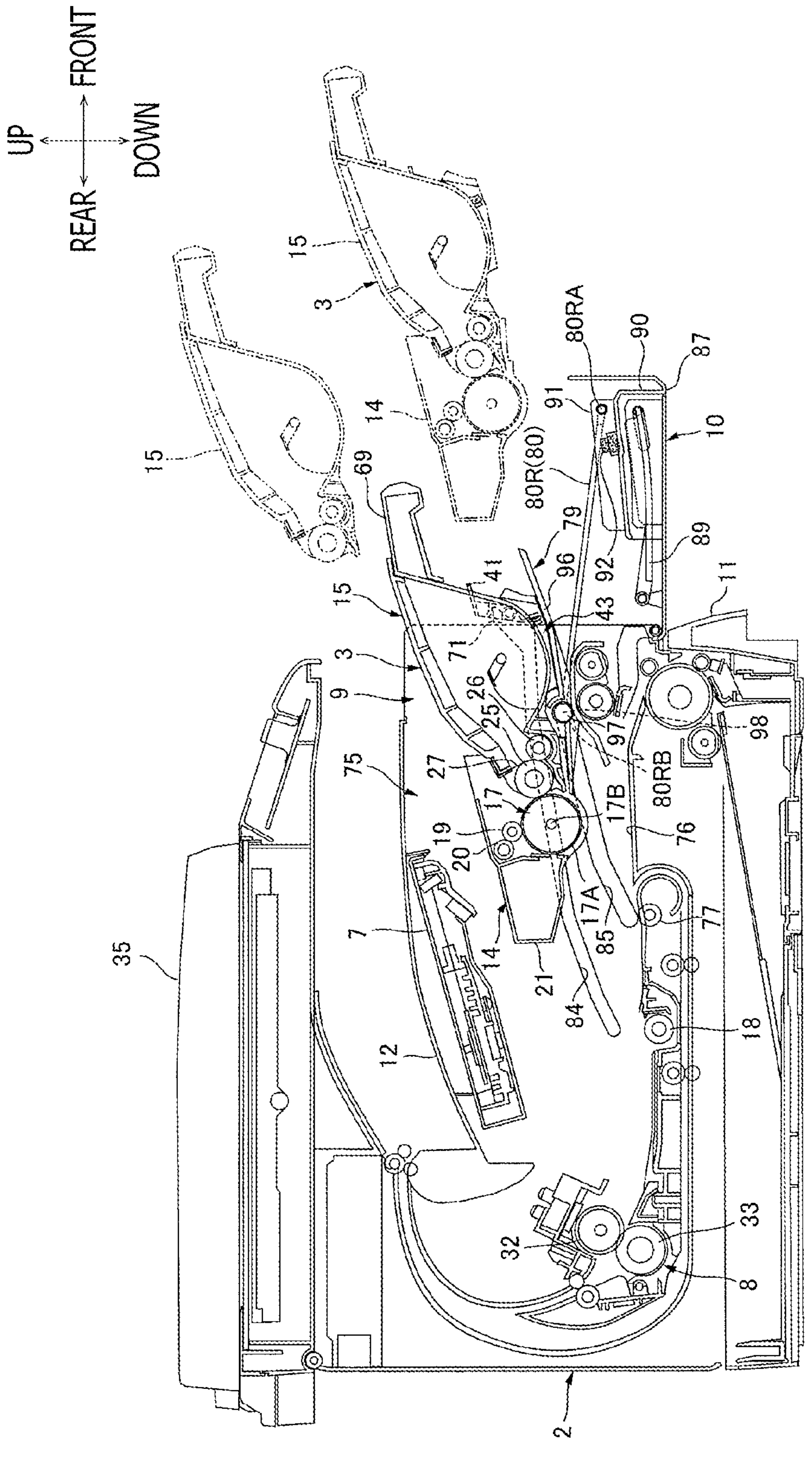
FIG. 5 is an illustrative view of the image forming apparatus with the process cartridge and a developer cartridge moved with respect to the image forming apparatus according to the first exemplary embodiment of the present disclosure.

The main body 2 includes, as shown in FIGS. 1 and 5, the cover 10, a side wall 75 on the right having grooves 84, 85, a side wall (not shown) on the left having grooves 84, 85, a first guide 76, the cartridge supporter 79, and a link member 80. In the following description, a written expression "side walls 75" may include the side wall 75 on the right and the side wall on the left which is not shown.

4-1. Cover

The cover 10 includes, as shown in FIG. 1, a covering body 87, two (2) supportive parts 91, two (2) presser parts 92, and a manual-feeder tray 89. The following description of the cover 10 is, unless otherwise noted, based on a basic condition of the cover 10 being in a closing position (see, for example, FIG. 1).

The covering body 87 is formed to have a shape of a plate spreading in the vertical and widthwise directions. The covering body 87 includes a feeder-tray storage 90.

The feeder-tray storage 90 is formed at an approximately central position, in a front view, of the covering body 87 to dent rearward. The feeder-tray storage 90 is formed to have an approximate shape of a box that is open frontward.

The supportive parts 91 are located on a rearward face of the feeder-tray storage 90. The supportive parts 91 are arranged to project rearward from the rearward face of the feeder-tray storage 90. Each supportive part 91 is formed to have a shape of a rectangular bar longitudinally extending in the vertical direction. As shown in FIG. 4, the supportive parts 91 are arranged to be spaced apart from each other along the widthwise direction. A distance between the supportive parts 91 is greater than a widthwise dimension of the handle 69 on the frame 62.

The presser parts 92 are, as shown in FIG. 1, located on the rearward face of the feeder-tray storage 90. Each presser part 92 is formed to have an approximate shape of a cylindrical block axially extending rearward with a rearward end being closed. The presser part 92 contains a coil spring (not shown) therein. Each presser part 92 is arranged such that a frontward end thereof contacts the rearward face of the feeder-tray storage 90. The presser parts 92 are, as shown in FIG. 4, arranged to be spaced apart from each other along the widthwise direction. A dimension of each presser part 92 in the front-rear direction is, when the coil spring therein is in a condition of natural length, smaller than a dimension of the supportive part 91 in the front-rear direction.

The manual feeder tray 89 is, as shown in FIG. 1, storable inside the feeder-tray storage 90. The manual feeder tray 89 is formed to have a plate-like shape spreading vertically. The manual feeder tray 89 is supported by the covering body 87 swingably about a lower end thereof.

4-2. Side Walls

The side wall 75 on the right is located on a rightward end of the main body 2. The side wall 75 on the right is formed to have a plate-like shape spreading in the vertical and front-rear directions.

The groove 84 is formed to guide the process cartridge 3 moving in the main body 2. The groove 84 is formed on an inner (leftward) surface of the side wall 75 on the right to dent outward (rightward) along the widthwise direction. The groove 84 is formed to longitudinally extend rearward from the opening 9. A rear end of the groove 84 is located above the transfer roller 18.

The groove 85 is located at a lower position with respect to the groove 84. The groove 85 is formed to guide the cartridge supporter 79 moving in the main body 2. The groove 85 is formed on the inner (leftward) surface of the side wall 75 to dent outward (rightward) along the widthwise direction. The groove 85 is formed to longitudinally extend in the front-rear direction. A rear end of the groove 85 is located above a first conveyer roller 77, and a front end of the groove 85 is located rearward with respect to a front end of the groove 84.

The side wall (not shown) on the left is located on the leftward end of the main body 2. The side wall on the left is, similarly to the side wall 75 on the right, formed to have a groove 84 and a groove 85 on an inner (rightward) surface thereof.

4-3. First Guide

The first guide 76 is configured to guide the sheet P fed from the sheet-feeder tray 11 toward the position between the photosensitive drum 17 and the transfer roller 18 in conjunction with a second guide 96, which will be described later. The first guide 76 is located at a lower position with respect to the grooves 85 in the side walls 75 and at an upper position with respect to the sheet-feeder tray 11. The first guide 76 is formed to have a plate-like shape spreading in the front-rear and widthwise directions. The first guide 76 includes the first conveyer roller 77.

The first conveyer roller 77 is configured to convey the sheet P fed from the sheet-feeder tray 11 toward the position between the photosensitive drum 17 and the transfer roller 18 in conjunction with a second conveyer roller 97, which will be described later. The first conveyer roller 77 is located at an approximately central position in the front-rear direction of the first guide 76. The first conveyer roller 77 is formed to have a cylindrical shape axially extending in the widthwise direction. The first conveyer roller 77 is rotatable.

4-4. Cartridge Supporter

The cartridge supporter 79 is movable between a first position (see FIG. 1), in which the cartridge supporter 79 is in an inner space formed inside the main body 2, and a second position (see FIG. 5), in which a front end of the cartridge supporter 79 projects frontward to be exposed through the opening 9.

The inner space in the main body 2 is a room, in which the process cartridge 3 may be loaded. Specifically, the inner space in the main body 2 may be a room between the scanner unit 7 and the first guide 76 with regard to the vertical direction and between the fuser unit 8 and the cover 10 being in the closing position with regard to the front-rear direction.

4-4-1. Configuration of the Cartridge Supporter

The cartridge supporter 79 includes, as shown in FIGS. 3A-3B, the second guide 96, two (2) convex parts 95, and the second conveyer roller 97.

The second guide 96 is formed to have a plate-like shape spreading in the front-rear and widthwise directions.

The convex parts 95 are located at an approximately central position in the front-rear direction and at widthwise ends of the cartridge supporter 79 to be separated from each other along the widthwise direction. Each convex part 95 is formed to protrude upward from an upper surface of the second guide 96. The convex part 95 is formed to have a semicircular plate-like shape in a sideward view along the widthwise direction.

The second conveyer roller 97 is located at an approximately central position in the front-rear direction of the cartridge supporter 79. The second conveyer roller 97 is formed to have a cylindrical shape axially extending in the widthwise direction. The second conveyer roller 97 is arranged to overlap the convex parts 95 along the widthwise direction. In other words, the second conveyer roller 97 is arranged to align in line with the convex parts 95 along the widthwise direction. A rightward end of the second conveyer roller 97 is rotatably supported by the convex part 95 on the right, and the rightward end of the second conveyer roller 97 protrudes rightward through the convex part 95 on the right. A leftward end of the second conveyer roller 97 is rotatably supported by the convex part 95 on the left, and the leftward end of the second conveyer roller 97 protrudes leftward through the convex part 95 on the left. The second conveyer roller 97 includes protrusive parts 98, which protrude outward beyond the convex parts 95 along the widthwise direction.

4-4-2. Location of the Cartridge Supporter when in the First Position

The cartridge supporter 79 is, when in the first position as shown in FIG. 1, located in an approximately central area in the vertical direction of the main body 2.

Specifically, the cartridge supporter 79 is located above the first guide 76. Meanwhile, a rearward end of the cartridge supporter 79 is located frontward with respect to the transfer roller 18. While the second guide 96 may be arranged to be in proximity to the first guide 76, the cartridge supporter 79 is in an arrangement to maintain a clearance between the second guide 96 and the first guide 76, so that the sheet P may be conveyed in the clearance.

The second conveyer roller 97 is located above the first conveyer roller 77 to contact the first conveyer roller 77.

The action to form images on the sheet P mentioned above is performed when the cartridge supporter 79 is in the first position. In the image forming action, the sheet P conveyed from the sheet-feeder tray 11 is fed to the position between the first guide 76 and the second guide 96 in the cartridge supporter 79 and conveyed by the first conveyer roller 77 and the second conveyer roller 97 in the cartridge supporter 79 to pass through the clearance between the first guide 76 and the second guide 96 in the cartridge supporter 79. Thus, the sheet P is fed to the position between the photosensitive drum 17 and the transfer roller 18.

4-4-3. Location of the Cartridge Supporter when in the Second Position

The cartridge supporter 79 is, when in the second position as shown in FIG. 5, located in the frontend area of the main body 2.

Specifically, the cartridge supporter 79 is arranged in a position, where the rearward end thereof stays in the inner space inside the main body 2 on the inner side with respect to the opening 9, and the frontward end thereof is outside the inner space of the main body 2 through the opening 9. In other words, a rearward part of the cartridge supporter 79 may stay inside the main body 2, and a frontward part of the cartridge supporter 79 may be outside the main body 2.

Meanwhile, the second guide 96 is spaced apart from the first guide 76, and the second conveyer roller 97 is spaced apart from the first conveyer roller 77.

4-5. Link Member

The link member 80 is, as shown in FIGS. 3B and 4, arranged to couple the cover 10 with the cartridge supporter 79. The link member 80 includes a link member 80R and a link member 80L, which are arranged to be spaced apart from each other across the cartridge supporter 79 along the widthwise direction.

The link member 80R couples the supportive part 91 on the right of the cover 10 with the protrusive part 98 on the right of the cartridge supporter 79. The link member 80R is formed to have an approximate shape of a rod. The link member 80R includes a first end 80RA, which is rotatably supported by the supportive part 91 on the right of the cover 10, and a second end 80RB. The second end 80RB is formed to have an approximately cylindrical shape, which axially extends in the widthwise direction. The second end 80RB embraces the protrusive part 98 on the right of the cartridge supporter 79 therein and is fitted in the groove 85 formed in the side wall 75. In other words, the protrusive part 98 on the right of the supportive part 79 is inserted in the groove 85 in the side wall 75 on the right through the second end RB of the link member 80R. Thus, the second end 80RB is rotatably engaged with the protrusive part 98 on the right of the cartridge supporter 79.

The link member 80L couples a supportive part 91 on the left of the cover 10 with the protrusive part 98 on the left of the cartridge supporter 79. The link member 80L is formed to have an approximate shape of a rod. The link member 80L includes a first end 80LA, which is rotatably supported by the supportive part 91 on the left of the cover 10, and a second end 80LB. The second end 80LB is formed to have an approximately cylindrical shape, which axially extends in the widthwise direction. The second end 80LB embraces the protrusive part 98 on the left of the cartridge supporter 79 therein and is fitted in the groove 85 formed in the side wall which is not shown. In other words, the protrusive part 98 on the left of the cartridge supporter 79 is inserted in the groove 85 in the side wall on the left through the second end LB of the link member 80L. Thus, the second end 80LB is rotatably engaged with the protrusive part 98 on the left of the cartridge supporter 79.

5. LOCATION OF THE PROCESS CARTRIDGE

The process cartridge 3 is located on an upper surface of the cartridge supporter 79. Specifically, the process cartridge 3 is in an arrangement, although details are not shown, that the concave part 51R of the drum frame 40 is fitted around the convex part 95 on the right, and as shown in FIG. 3B, the concave part 51L of the drum frame 40 is fitted around the convex part 95 on the left. With this fitting structure, the process cartridge 3 may be placed in a correct position with respect to the cartridge supporter 79.

The process cartridge 3 on the cartridge supporter 79 is thus movable along with the cartridge supporter 79, which is movable between the first position and the second position.

5-1. Condition of the Process Cartridge Supported by the Cartridge Supporter being in the First Position When the cartridge supporter 79 is in the first position, the process cartridge 3 is placed entirely in the inner space formed inside the main body 2 on the inner side with respect to the opening 9.

That is, the rightward end of the drum shaft 17B is inserted in a rear end part of the groove 84 formed in the side wall 75 on the right, and the leftward end of the drum shaft 17B is inserted in a rear end part of the groove 84 formed in the side wall on the left which is not shown.

The photosensitive drum 17 is located above the transfer roller 18 to contact the transfer roller 18. The condition, in which the photosensitive drum 17 and the transfer roller 18 contact each other, may be recognized as an attached condition for the process cartridge 3 to the main body 2.

The frontward end of the handle 69 contacts the rearward ends of the presser parts 92 of the cover 10 being in the closing position. Thereby, the developer cartridge 15 is pushed rearward, and the developer roller 25 may be stably pressed against the photosensitive drum 17 in the drum cartridge 14.

5-2. Condition of the Process Cartridge Supported by the Cartridge Supporter being in the Second Position When the cartridge supporter 79 is in the second position, the process cartridge 3 is in the arrangement that the frontward part thereof is outside the inner space formed inside the main body 2. Specifically, the switching member 41 of the drum cartridge 14 and the handle 69 in the developer cartridge 15 are located outside the inner space of the main body 2.

The rightward end of the drum shaft 17B is inserted in an approximate central part in the front-rear direction of the groove 84 formed in the side wall 75 on the right, and the leftward end of the drum shaft 17B is inserted in an approximate central part in the front-rear direction of the groove 84 formed in the side wall on the left which is not shown. Meanwhile, the photosensitive drum 17 is separated from the transfer roller 18. The photosensitive drum 17 may be, when the cartridge supporter 79 is in the second position, placed entirely in the inner space inside the main body 2. In this regard, however, solely a part of the photosensitive drum 17 may be placed in the inner space inside the main body 2 when the cartridge supporter 79 is in the second position.

The process cartridge 3 may be detached from the main body 2 when, for example, the drum cartridge 14 is replaced with a new drum cartridge 14, or when the sheet P jammed in the main body 2 is to be removed.

When the process cartridge 3 is to be detached from the main body 2, the user may grip and pull the handle 69 of the process cartridge 3 outward to separate the process cartridge 3 from the cartridge supporter 79 being in the second position.

Thereby, the process cartridge 3 may be moved along the grooves 84, and the process cartridge 3 may be separated from the main body 2.

When the process cartridge 3 is to be attached in the main body 2, the user may place the process cartridge 3 on the cartridge supporter 79 being in the second position.

The user may thereafter place the cover 10 in the closing position so that the cartridge supporter 79 may be placed in the first position.

Thus, the process cartridge 3 may be loaded to be attached to the main body 2.

6. DETACHMENT AND ATTACHMENT OF THE DEVELOPER CARTRIDGE

6-1. Detachment of the Developer Cartridge

The developer cartridge 15 may be detached from the drum cartridge 14 when the cover 10 of the main body 2 is placed in the open position, as shown in FIG. 5.

When the cover 10 of the main body 2 is moved to the open position, the first ends 80RA, 80LA of the link members 80R, 80L are pulled frontward.

Accordingly, the second ends RB, LB of the link members 80R, 80L move frontward along the grooves 85 formed in the side walls 75. The cartridge supporter 79, with the protrusive parts 98 on the right and the left inserted in the second ends 80RB, 80LB of the link members 80R, 80L respectively, moves to the second position in conjunction with the cover 10 moving to the open position. Thus, the grooves 85 guide the cartridge supporter 79 to move therealong.

Meanwhile, the rightward end and the leftward end of the drum shaft 17B of the photosensitive drum 17 in the process cartridge 3 move frontward along the grooves 84 formed in the side walls 75.

Thereafter, the user may separate the developer cartridge 15 from the drum cartridge 14 being placed on the upper surface of the cartridge supporter 79.

Specifically, the user may detach the developer cartridge 15 from the drum cartridge 14 by operating the operable lever 58 to move the switching member 41 to pivot about the shaft 56, for example, clockwise in a rightward view from the left (see FIG. 2A).

Accordingly, as indicated by dash-and-dots lines in FIG. 2A, the connector 57 in the switching member 41 contacts an upper end of the front wall 45 of the drum cartridge 14. In this state, the projection 59 is in a frontward position with respect to the projection 71.

Meanwhile, a lower end of the flexible part 60 in the switching member 41 is bowed in the position between the pared pieces in the stopper 52.

Thus, the switching member 41 is moved from the restrictive position to the releasable position.

Next, while the switching member 41 is in the releasable position, the user may grip the handle 69 and pull the developer cartridge 15 frontward. Thereby, the developer collars 25CR, 25CL are guided in the grooves 53R, 53L, respectively. The developer cartridge 15 may be thus detached from the drum cartridge 14.

After detachment of the developer cartridge 15, the drum cartridge 14 may be maintained held on the supported base 79.

6-2. Attachment of the Developer Cartridge

The developer cartridge 15 may be attached to the drum cartridge 14 when the drum cartridge 14 is supported on the cartridge supporter 79 being in the second position.

Specifically, the developer collars 25CR, 25CL of the developer roller 25 are guided in the grooves 53R, 53L, respectively. Thereby, the developer cartridge 15 may be loaded in the developer cartridge mount 43 in the drum cartridge 14.

Meanwhile, as shown in FIGS. 3A-3B, the lower end of the projection 71 in the developer cartridge 15 may contact the projection 59 in the switching member 41 to press the projection 59 from above. Thereby, the switching member 41 may be moved to rotate about the shaft 56, for example, clockwise in the rightward view from the left.

As the switching member 41 is rotated further, the projection 71 may be placed to the position lower than the projection 59. In this regard, the switching member 41 may move to rotate counterclockwise in the rightward view from the left by resiliency of the flexible part 60.

Thereby, the projection 71 is located in the position between the projection 59 and the shaft 56 to be engaged with the projection 59.

Thus, with the projection 71 being engaged with the projection 59, attachment of the developer cartridge 15 to the drum cartridge 14 may be completed.

Thereafter, the cover 10 may be placed back in the closing position. Thereby, the link member 80 is moved in conjunction with the cover 10, and the cartridge supporter 79 is moved to the first position.

7. BENEFITS (1) According to the image forming apparatus 1 described above, as shown in FIGS. 1 and 5, the cartridge supporter 79 is movable between the first position and the second position while the cartridge supporter 79 supports the process cartridge 3.

When the cartridge supporter 79 is in the second position, as shown in FIG. 5, the frontward part of the process cartridge 3, together with the switching member 41, is placed outside the main body 2, or more specifically, outside the inner space of the main body 2.

Therefore, when the cartridge supporter 79 is in the second position, the user may reach and operate the switching member 41 easily.

Accordingly, while the process cartridge 3 is supported by the cartridge supporter 79, the user may easily attach or detach the developer cartridge 15 to or from the drum cartridge 14 for replacement.

(2) According to the image forming apparatus 1 described above, as shown in FIG. 5, the photosensitive drum 17 in the process cartridge 3, which is supported by the cartridge supporter 79 in the second position, is entirely placed inside the inner space inside the main body 2.

Therefore, for example, when the developer cartridge 15 is replaced with a new developer cartridge 15, the drum body 17A may be prevented from being exposed outside so that adherence of floating substance such as dust to the surface of the drum body 17A may be restrained.

(3) According to the image forming apparatus 1 described above, as shown in FIGS. 1 and 5, when the cartridge supporter 79 moves from the first position to the second position, the second conveyer roller 97 is separated from the first conveyer roller 77.

Therefore, when, for example, the sheet P is jammed at the position between the first conveyer roller 77 and the second conveyer roller 97, the sheet P may be removed easily.

(4) According to the image forming apparatus 1 described above, as shown in FIGS. 1 and 5, the protrusive parts 98 in the second conveyer roller 97 are inserted in the grooves 85 in the main body 2 to be guided.

Therefore, the cartridge supporter 79 may be moved between the first position and the second position smoothly and correctly.

(5) According to the image forming apparatus 1 described above, as shown in FIGS. 1 and 5, the link member 80 may move the cartridge supporter 79 in conjunction with the opening and closing motion of the cover 10 between the first position and the second position.

Therefore, the cartridge supporter 79 may be movable between the first position and the second position by the opening and closing motion of the cover 10.

(6) According to the image forming apparatus 1 described above, as shown in FIGS. 4, the link member 80 is engageable with the protrusive parts 98.

Therefore, the opening and closing motion of the cover 10 and the movement of the supporting member 79 may be linked with each other by the uncomplicated configuration of the link member 80.

(7) According to the image forming apparatus 1 described above, as shown in FIGS. 1 and 5, the second guide 96 may be separated from the first guide 76 by the cartridge supporter 79 moving from the first position to the second position.

Therefore, when, for example, the sheet P is jammed at the position between the first guide 76 and the second guide 96, the sheet P may be removed easily.

(8) According to the image forming apparatus 1 described above, as shown in FIGS. 2A and 3A, the switching member 41 may rotate about the shaft 56.

Therefore, engagement and disengagement between the projection 71 in the frame 62 and the projection 59 in the switching member 41 may be easily switched.

(9) According to the image forming apparatus 1 described above, as shown in FIG. 5, when the cartridge supporter 79 is in the second position, the operable lever 58 is outside the inner space to be exposed from the main body 2.

Therefore, the user may operate the operable lever 58 easily and unmistakably.

8. SECOND EMBODIMENT

Bellow will be described a second exemplary embodiment of the image forming apparatus 1 according to the present disclosure with reference to FIGS. 6-8. In the following description, items and structures which are identical or equivalent to those described in the previous embodiment may be referred to by the same reference signs, and explanation of those will be omitted.

8-1. Overall Configuration of the Image Forming Apparatus in the Second Embodiment In the first embodiment described above, it was described that the link member 80 in the image forming apparatus 1 manipulates the cartridge supporter 79 to move between the first position and the second position in conjunction with the opening and closing motion of the cover 10. However, the cartridge supporter 79 may not necessarily be manipulated by the link member 80. In the image forming apparatus 1 according to the second embodiment, as shown in FIGS. 6 and 8, the main body 2 does not include the link member 80 but includes a cartridge supporter 101, which may be manipulated directly by the user to move between the first position and the second position.

Further, in the first embodiment described above, the cover 10 includes the presser parts 92 that may press the developer cartridge 15 toward the photosensitive drum 17, and the drum cartridge 14 includes the switching member 41. However, the cover 10 may not necessarily include the presser parts 92, and the drum cartridge 14 may not necessarily include the switching member 41. In the image forming apparatus 1 according to the second embodiment, as shown in FIG. 6, the cover 10 does not include the presser parts 92, and the drum cartridge 14 does not include the switching member 41 but includes a locking member 102.

Figure 6:
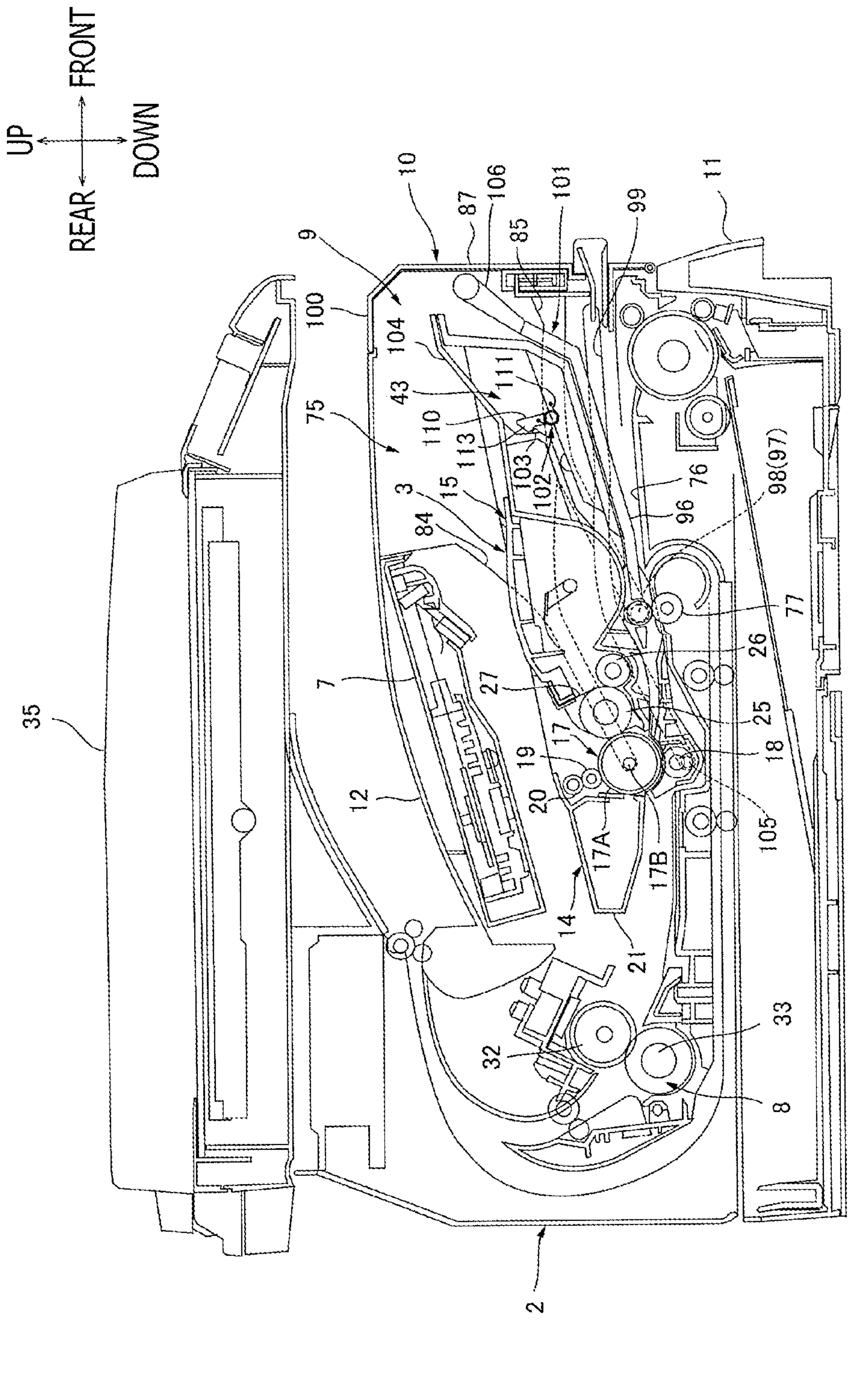
FIG. 6 is a cross-sectional view of an image forming apparatus according to a second exemplary embodiment of the present disclosure.

Furthermore, the transfer roller 18 may not necessarily be fixed to the main body 2 in the image forming apparatus 1 (see FIG. 5) but may be placed on the cartridge supporter 101 (see FIG. 6).

8-2. Detailed Configuration of the Image Forming Apparatus in the Second Embodiment

8-2-1. Configuration to Move the Cartridge Supporter

Figure 8:
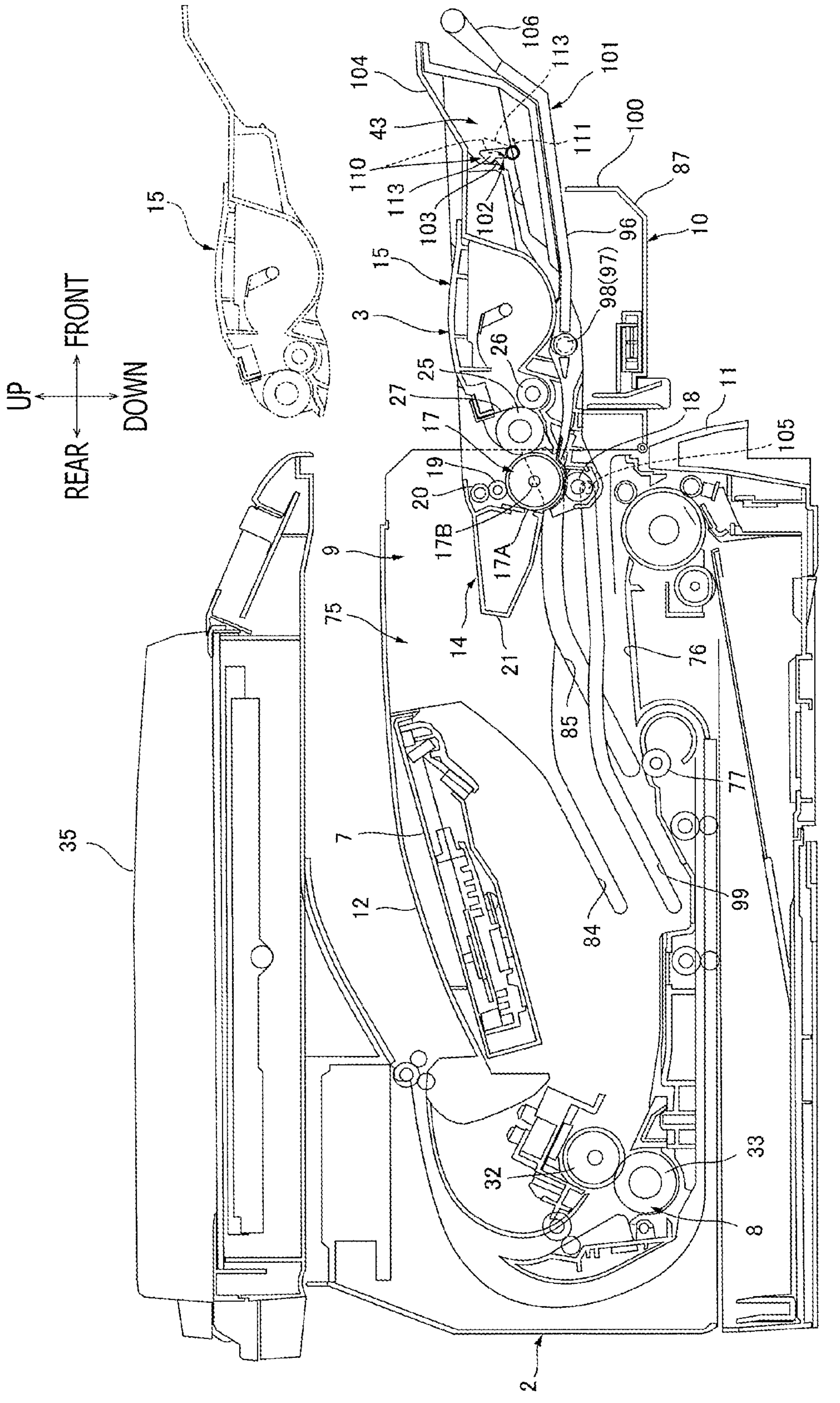
FIG. 8 is an illustrative view of the image forming apparatus with a process cartridge and the developer cartridge moved with respect to the image forming apparatus according to the second exemplary embodiment of the present disclosure.

As shown in FIGS. 6 and 8, the image forming apparatus 1 in the second embodiment includes grooves 99 formed in the side walls 75. The cover 10 does not include the supportive parts 91 or the presser parts 92 but includes a supportive part 100. The main body 2 includes the cartridge supporter 101.

The grooves 99 are, as shown in FIGS. 6 and 8, located at a lower position with respect to the grooves 84. Each groove 99 is formed to guide the cartridge supporter 101 moving between the first position and the second position. The grooves 99 are formed on the inner surfaces of the side walls 75 to dent outward along the widthwise direction. The grooves 99 are formed to longitudinally extend in the front-rear direction. A rear end of each groove 99 is located below the rear end of the groove 84 and rearward with respect to the first guide 76. A front end of each groove 99 is located below the front end of the groove 85. Each groove 99 is formed to intersect with the groove 85 at an approximately central position in the front-rear direction thereof.

The supportive part 100 is, as shown in FIG. 6, located at an upper end of the cover 100. The supportive part 100 is formed to have a plate-like shape extending from an upper end of the covering body 87 rearward to spread along the front-rear and widthwise directions.

The cartridge supporter 101 is movable between a first position (see FIG. 6), in which the cartridge supporter 101 is accommodated in the inner space inside the main body 2, and a second position (see FIG. 8), in which a front end of the cartridge supporter 101 projects frontward through the opening 9.

Figure 7A:
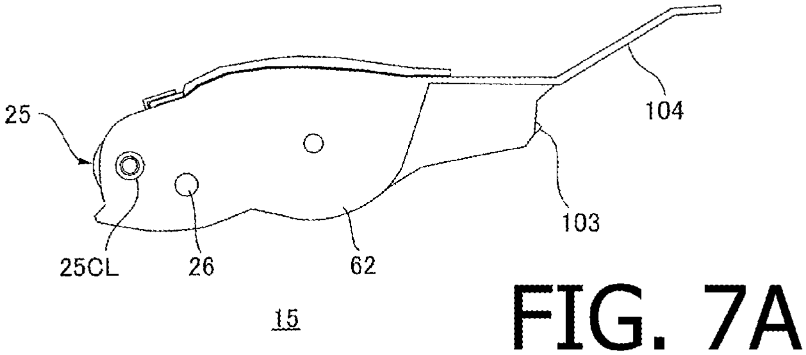
FIG. 7A is a side view of a developer cartridge in the image forming apparatus according to the second exemplary embodiment of the present disclosure.
Figure 7B:
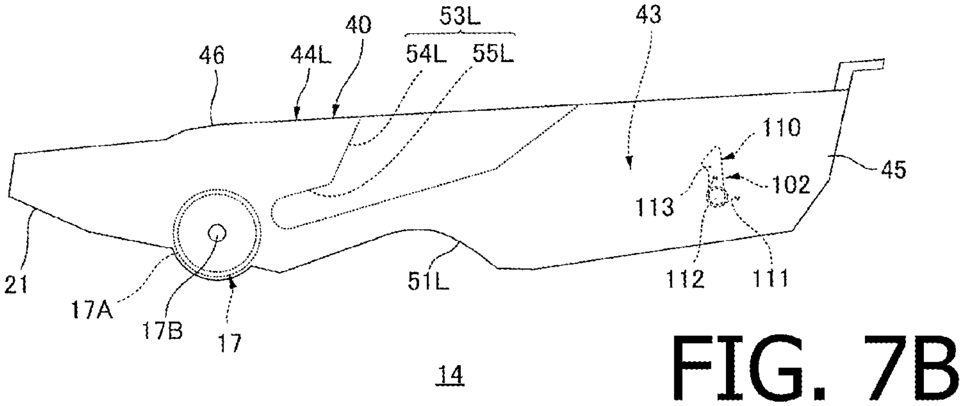
FIG. 7B is a side view of a drum cartridge in the image forming apparatus according to the second exemplary embodiment of the present disclosure.
Figure 7C:
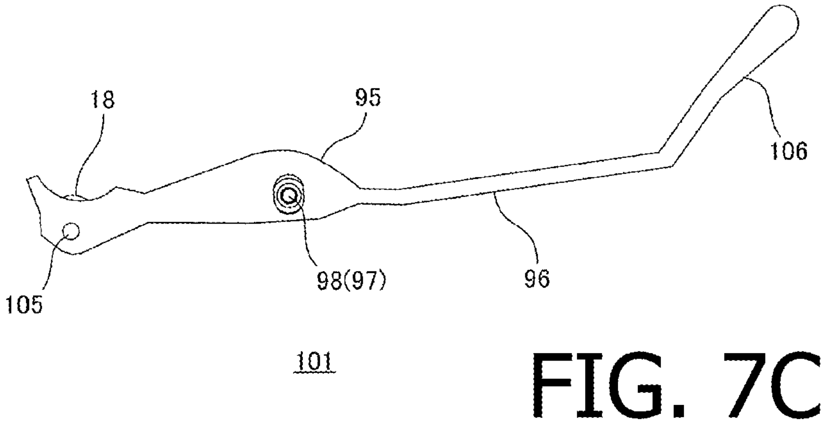
FIG. 7C is a side view of a cartridge supporter in the image forming apparatus according to the second exemplary embodiment of the present disclosure.

The cartridge supporter 101 includes, as shown in FIG. 7C and similarly to the cartridge supporter 79 in the first embodiment, the second guide 96, the two (2) convex parts 95, and the second conveyer roller 97. Further, the cartridge supporter 101 includes two (2) protrusive parts 105 and a handle 106.

The protrusive parts 105 are located at a rear end of the cartridge supporter 101. Each protrusive part 105 is formed to have an approximately cylindrical shape axially extending outward along the widthwise direction from a widthwise outer surface of the cartridge supporter 101.

The handle 106 is located at a front end of the cartridge supporter 101. The handle 106 is formed to extend from the front end of the cartridge supporter 101 upper-frontward.

The cartridge supporter 101 is, when in the first position as shown in FIG. 6, located at an approximately central position in the vertical direction of the main body 2. Specifically, the cartridge supporter 101 is located above the first guide 76. The protrusive parts 105 of the cartridge supporter 101 are inserted in rear end areas in the grooves 99. The handle 106 is located rearward with respect to the cover 10. Therefore, the handle 106 faces the cover 10 through the opening 9. The handle 106 is located frontward with respect to the drum cartridge 14 when the process cartridge 3 is accommodated in the inner space inside the main body 2.

The cartridge supporter 101 is, when in the second position as shown in FIG. 8, located at the front end of the main body 2. Specifically, the cartridge supporter 101 is located in a position, where the rearward end thereof stays in the inner space inside the main body 2 on the inner side with respect to the opening 9, and the frontward end thereof is outside the inner space of the main body 2. In other words, a rearward part of the cartridge supporter 101 may stay inside the main body 2, and a frontward part of the cartridge supporter 101 may be outside the main body 2 through the opening 9. The protrusive parts 105 of the cartridge supporter 101 are inserted in the frontend parts in of the grooves 99. The front end of the cartridge supporter 101 is supported by the supportive part 100 of the cover 10 being in the open position.

8-2-2. Configuration of the Locking Member

In the image forming apparatus 1 according to the second embodiment, the drum cartridge 14 includes, as shown in FIG. 7B, the locking member 102. Meanwhile, the developer cartridge 15 includes, as shown in FIG. 7A, a projection 103 and a switching member 104, which may be in a different shape from the handle 69 in the first embodiment.

Meanwhile, the second guide 96 is spaced apart from the first guide 76, and the second conveyer roller 97 is spaced apart from the first conveyer roller 77.

The locking member 102 includes, as shown in FIG. 7B, an engageable part 110 and a coil spring 111.

The engageable part 110 is movable between a restrictive position, which is indicated in solid lines in FIGS. 6 and 8, and a releasable position, which is indicated in dash-and-dots lines in FIG. 8. The following description concerning the engageable part 110 is, unless otherwise noted, based on a basic condition of the engageable part 110 being in the restrictive position. The engageable part 110 includes a shaft 112 and a claw 113.

The shaft 112 is formed to have a cylindrical shape axially extending in the widthwise direction. The shaft 112 is rotatably supported by a frontend part of the side wall 44R.

The claw 110 extends upward from an inward end in the widthwise direction of the shaft 112. An upper end of the claw 113 projects rearward.

The engageable part 110 is pivotable about the shaft 112. The engageable part 110 may be pivoted about the shaft 12 clockwise in the rightward view from the left to be placed in the releasable position.

The coil spring 111 is arranged to extend axially in the widthwise direction. The coil spring 111 is fixed to the side wall 44R at one end thereof and to the claw 113 at the other end thereof. Therefore, the coil spring 111 tends to urge the engageable part 110 to be located in the restrictive position in a basic condition.

The projection 103 is, as shown in FIG. 7A, formed to have a triangular shape in a side view in the widthwise direction projecting frontward from a front wall of the frame 62.

The switching member 104 is located in a frontend area in the developer cartridge 15. The switching member 104 may be operated by the user to detach the developer cartridge 15 from the drum cartridge 14. The switching member 104 is arranged to extend continuously frontward from the upper end of the frame 62. The switching member 104 is formed to have a plate-like shape spreading in the widthwise and front-rear directions.

The developer cartridge 15 is, as shown in FIG. 6, attachable to the developer cartridge mount 43 in the drum cartridge 14.

The developer cartridge 15 is restricted from being detached from the drum cartridge 14 by the claw 113 of the engageable part 110 in the locking member 102 being located at an upper position with respect to the projection 103. In other words, the projection 103 and the engageable part 110 are engaged with each other to restrict the developer cartridge 15 from being detached.

Meanwhile, the developer cartridge 15 is pressed rearward by the engageable part 110, which is urged by the coil spring 111, contacting the front end of the frame 62, and the developer roller 25 is pressed against the photosensitive drum 17 in the drum cartridge 14.

8-2-3. Location of the Transfer Roller

In the image forming apparatus 1 according to the second embodiment, as shown in FIG. 7C, the transfer roller 18 is placed on the cartridge supporter 101.

The transfer roller 18 is located in a rear end area in the cartridge supporter 101 and rotatably supported by the cartridge supporter 101. When the cartridge supporter 101 is in the first position, the transfer roller 18 is in a rearward position with respect to the first guide 76.

8-3. Detachment and Attachment of the Developer Cartridge

The developer cartridge 15 may be detached from the drum cartridge 14 when the cover 10 of the main body 2 is placed in the open position, as shown in FIG. 8.

With the cover 10 being in the open position, the user may grip the handle 106 and pull the cartridge supporter 101 frontward to place the cartridge supporter 101 in the second position.

Next, the user may grip the switching member 104 in the developer cartridge 15 to pull the developer cartridge 15 upward. Thereby, the projection 103 in the developer cartridge 15 moves the engageable part 110 in the locking member 102 to rotate against the urging force of the coil spring 111 and places the engageable part 110 in the releasable position.

Thereafter, when the projection 103 moves to an upward position with respect to the engageable part 110, the engageable part 110 returns to the restrictive position by the urging force of the coil spring 111.

Thus, the user may operate the switching member 104 in the developer cartridge 15 to detach the developer cartridge 15 from the drum cartridge 14.

After detachment of the developer cartridge 15, the drum cartridge 14 may be maintained held on the supported base 101.

The developer cartridge 15 may be attached to the drum cartridge 14 when the drum cartridge 14 being held on the cartridge supporter 101, which is in the second position.

Specifically, the developer cartridge 15 may be attached to the developer cartridge mount 43 in the drum cartridge 14.

The lower end of the projection 103 in the developer cartridge 15 being attached to the drum cartridge 14 contacts the claw 113 in the engageable part 110 of the locking member 102 from above. Thereby, the engageable part 110 may be pressed downward and pivot about the shaft 112 to be farther from the frame 62.

When the projection 103 of the descending developer cartridge 15 passes by the engageable part 110, the engageable part 110 is moved by the urging force of the coil spring 111 to pivot about the shaft 112 to be closer to the frame 62.

Accordingly, the claw 113 in the engageable part 110 of the locking member 102 is placed at an upper position with respect to the projection 103 to be engaged with the projection 103.

Thus, with the projection 103 being engaged with the engageable part 110, attachment of the developer cartridge 15 to the drum cartridge 14 may be completed.

The user may push the cartridge supporter 101 back in the main body 2 in the first position.

Thereafter, the cover 10 may be placed back in the closing position.

8-4. Benefits by the Second Embodiment (1) According to the image forming apparatus 1 in the second embodiment, when the cartridge supporter 101 is in the first position, as shown in FIG. 6, the handle 106 faces the cover 10 through the opening 9. The handle 106 may be exposed through the opening 9 when the cover 10 is in the open position, and the user may access the handle 106 easily.

Therefore, the cartridge supporter 101 may be moved between the first position to the second position easily.

(2) According to the image forming apparatus 1 in the second embodiment, as shown in FIG. 8, the cartridge supporter 101 includes the transfer roller 18.

Therefore, when the process cartridge 3 is separated from the cartridge supporter 101, the photosensitive drum 17 is separated from the transfer roller 18.

Therefore, when the sheet P is jammed between the photosensitive drum 17 and the transfer roller 18, the sheet P may be easily removed.

(3) According to the image forming apparatus 1 in the second embodiment, when the cartridge supporter 101 is in the second position, as shown in FIG. 8, the supportive part 100 in the cover 10 supports the cartridge supporter 101.

Therefore, the cartridge supporter 101 may be maintained in the second position more stably by the supportive part 100.

Accordingly, while the process cartridge 3 is supported by the cartridge supporter 101, the developer cartridges 15 may be stably replaced.

9. THIRD EMBODIMENT

Bellow will be described a third exemplary embodiment of the image forming apparatus 1 according to the present disclosure with reference to FIGS. 9-12. In the following description, items and structures which are identical or equivalent to those described in the previous embodiments may be referred to by the same reference signs, and explanation of those will be omitted.

Figure 9:
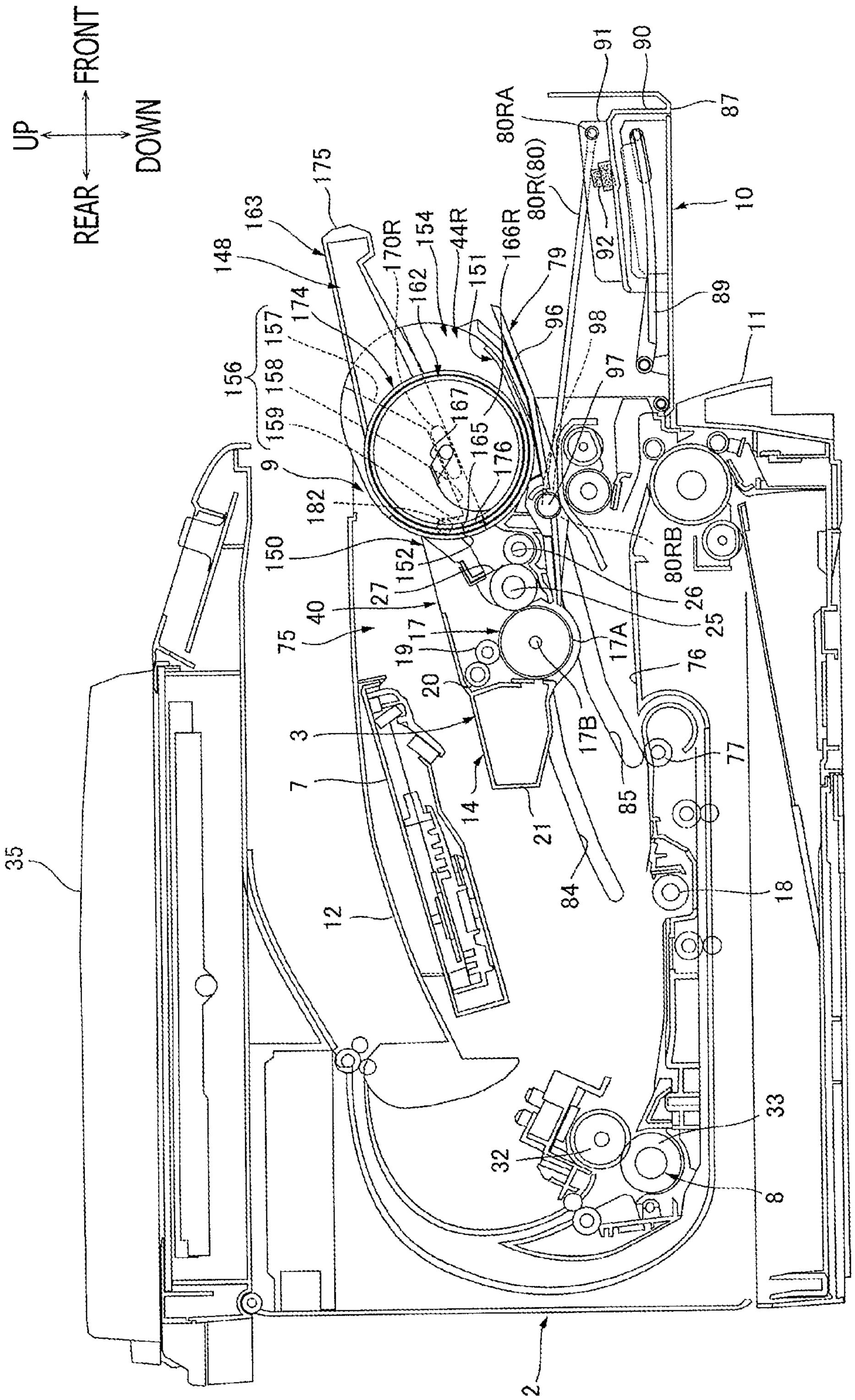
FIG. 9 is a cross-sectional view of the image forming apparatus, with a cartridge supporter at a second position and a switching member in a toner cartridge at a restrictive position, according to a third exemplary embodiment of the present disclosure.

9-1. Overall Configuration of the Image Forming Apparatus in the Third Embodiment In the first embodiment described above, as shown in FIG. 1, the process cartridge 3 contains the developer cartridge 15 including the developer roller 25 and the supplier roller 26. However, the process cartridge 3 may not necessarily include the developer cartridge 15 with the developer roller 25 and the supplier roller 26 but may have, as shown in FIG. 9, a toner cartridge 148 to contain toner.

9-1-1. Configuration of the Drum Cartridge

The drum cartridge 14 according to the third embodiment includes the photosensitive drum 17 and the drum frame 40 as described above. Further, the drum cartridge 14 includes a developer device 150 and an arc wall 151 having an inlet 152.

The developer device 150 is located in an approximately central area with regard to the front-rear direction in the drum cartridge 14. The developer device 150 is formed to have an approximate shape of a rectangular box elongated in the widthwise direction. The developer device 150 contains toner therein. The developer device 150 includes the developer roller 25, the supplier roller 26, and the spreader blade 27, which are described above.

The arc wall 151 may serve as a front wall of the developer device 150. The arc wall 151 is formed to have a cross-sectional approximate shape of an arc, which curves and extends upper-frontward at one end of the curve and upper-rearward at the other end of the curve, in a side view along the widthwise direction.

The inlet 152 is located at an approximately central position in the vertical direction of the arc wall 151. The inlet 152 is formed through the arc wall 151 in the front-rear direction to allow communication between inside and outside of the developer device 150.

A part of the drum frame 40 located frontward with respect to the arc wall 151 forms a toner cartridge mount 154, to which the toner cartridge 148 may be attached.

Figure 11:
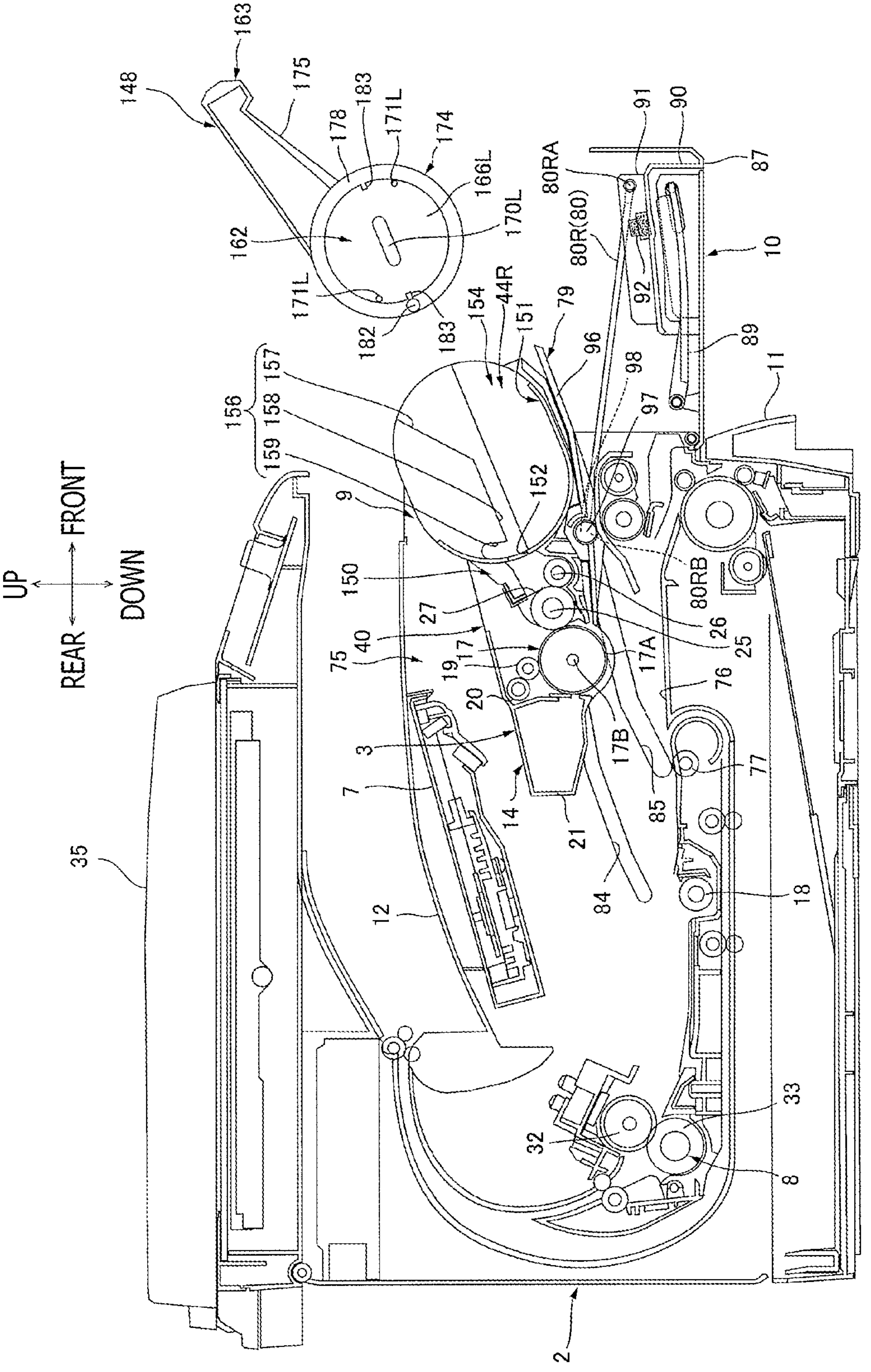
FIG. 11 is a cross-sectional view of the image forming apparatus, with the toner cartridge being detached, according to the third exemplary embodiment of the present disclosure.

Meanwhile, as shown in FIG. 11, the side wall 44R of the drum cartridge 14 is not formed to have the groove 53R, which is described in the first embodiment, but is formed to have a recess 156.

The recess 156 may guide the toner cartridge 148 to be attached to or detached from the drum cartridge 14. The recess 156 is a groove formed in the toner cartridge mount 154 on a widthwise inner surface of the side wall 44R to dent outward along the widthwise direction. The recess 156 is formed to extend in the front-rear direction and is open frontward. The recess 156 includes a wider section 157, a narrower section 158, and a first engageable part 159.

The wider section 157 is formed at a frontward position in the recess 156. The wider section 157 is formed to be smaller in height toward the rear side of the side wall 40.

The narrower section 158 is formed to extend continuously from a rear end of the wider section 157 to extend rearward. A height of the narrower section 158 is constant.

The first engageable part 159 is formed continuously from a rear end of the narrower section 158 to extend upward. The first engageable part 159 is formed to recess in the widthwise direction outward from the widthwise inner surface of the side wall 44R in the drum cartridge 14. The first engageable part 159 is formed to extend along an inner peripheral surface of the arc wall 151.

The side wall 44L is formed to have the recess 156, which is in the same form as the recess 156 formed in the side wall 44R.

9-1-2. Configuration of the Toner Cartridge

Figure 12A:
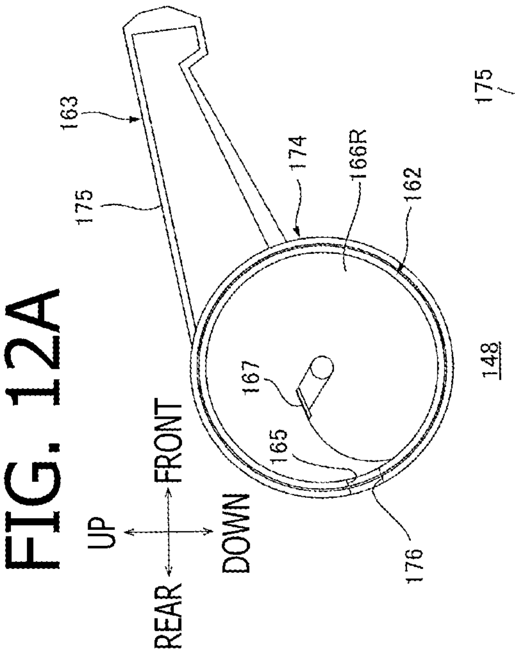
FIGS. 12A and 12B are a cross-sectional view and a side view of the toner cartridge according to the third exemplary embodiment of the present disclosure when the toner cartridge is in the position shown in FIG. 9.
Figure 12B:
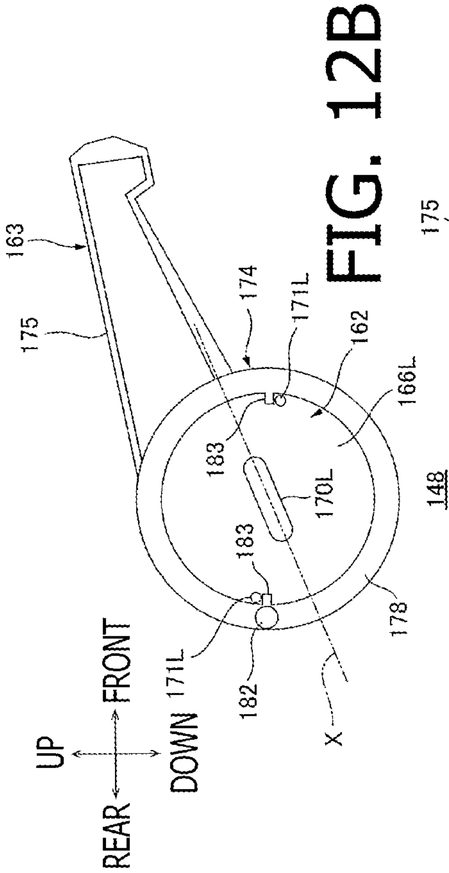

The toner cartridge 148 is, as shown in FIG. 11, attachable to and detachable from the toner cartridge mount 154 in the drum cartridge 14. The toner cartridge 148 includes, as shown in FIGS. 12A-12B, a container cylinder 162 having a first opening 165, a switching member 163, and an agitator 167.

The container cylinder 162 is formed to have an approximately cylindrical shape axially extending in the widthwise direction. The container cylinder 162 includes a closure wall 166L on the left and a closure wall 166R on the right.

The closure wall 166L is formed to have an approximate shape of a circular plate in a sideward view along the widthwise direction and is arranged to close a leftward end of the container cylinder 162. The closure wall 166L includes a boss 170L and two (2) stoppers 171L.

The boss 170L is formed to project outward along the widthwise direction from a widthwise outer surface of the closure wall 166L. The boss 170L is formed to have an approximate shape of a bar longitudinally extending in the front-rear direction. The boss 170L is in a shape to fit in the narrower section 158 in the side wall 44L.

The stoppers 171L are located on the closure wall 166L to be spaced apart from each other along the front-rear direction. The stoppers 171L are formed on a circumference of the closure wall 166L. A rearward one of the stoppers 171L is located at an upper position with respect to a rearward end of the boss 170L, and a frontward one of the stoppers 171L is located at a lower position with respect to a frontward end of the boss 170L. Each stopper 171L is formed to have a cylindrical shape axially projecting outward along the widthwise direction from the widthwise outward surface of the closure wall 166L.

The closure wall 166R is formed to have the same shape as the closure wall 166L and closes a rightward end of the container cylinder 162. As shown in FIG. 9, a boss 170R on the closure wall 166R is formed to fit in the narrower section 158 on the side wall 44R.

The agitator 167 is located at an axial center of the container cylinder 162. The agitator 167 may stir the toner contained in the container cylinder 162.

The first opening 165 is, as shown in FIG. 12A, located in a rear end area in the container cylinder 162. The first opening 165 is formed through a rearward end of the container cylinder 162 in the front-rear direction to allow communication between inside and outside of the container cylinder 162. The first opening 165, as shown in FIG. 9, overlap the inlet 152 to align approximately along the front-rear direction.

The switching member 163 may switch states in the process cartridge 3 between a state, in which the toner cartridge 148 is attached to the drum cartridge 14 and is restricted from being detached therefrom; and a state, in which the toner cartridge 148 is released from the restriction and is detachable from the drum cartridge 148. The switching member 163 is pivotable between a restrictive position (see FIG. 9) and a releasable position (see FIG. 10). The following description is, unless otherwise noted, based on a basic condition of the cartridge supporter 79 being in the second position, the toner cartridge 148 being attached to the drum cartridge 14, ant the switching member 163 being in the restrictive position. The switching member 163 includes an outer cylinder 174 having a second opening 176 and an operable lever 175.

The outer cylinder 174 is arranged on an outer circumference of the container cylinder 162. The outer cylinder 174 is formed to have a cylindrical shape axially extending in the widthwise direction. The outer cylinder 174 includes, as shown in FIG. 12B, a ring 178, which is arranged on each widthwise end of the outer cylinder 174. In other words, two (2) rings 178 are arranged on the widthwise ends of the outer cylinder 174. The ring 178 on the left and the ring 178 on the right are in an identical shape; therefore, in the following paragraphs, solely the ring 178 on the left may be described, and description of the ring 178 on the right may be omitted.

The ring 178 is located on the leftward end of the outer cylinder 174. The ring 178 is located outward with respect to the container cylinder 162 in the widthwise direction. The ring 178 is formed in a planar layer of ring stretching radially inward from a circumferential edge of the outer cylinder 174. The ring 178 includes a second engageable part 182 and two (2) contact parts 183.

The second engageable part 182 is located at a rearward position in the ring 178. The second engageable part 182 is located above a hypothetical line X extending along the longitudinal direction of the boss 170L. The second engageable part 182 is formed to have a cylindrical shape axially projecting outward in the widthwise direction from a widthwise outer surface of the ring 178. The second engageable part 182 may fit with the first engageable part 159 in the side wall 44L. In other words, the second engageable part 182 is engageable with the first engageable part 159.

The contact parts 183 are located on the ring 178 to be spaced apart from each other along the front-rear direction. The contact parts 183 are on an inner circumference of the ring 178. Each contact part 183 is formed to have a shape of a rectangular bar extending from the inner periphery of the ring 178 inward along a direction of radius in the ring 178. A rearward one of the contact parts 183 is located at a rearward end of the ring 178 and at a frontward position with respect to the second engageable part 182. The rearward one of the contact parts 183 is arranged to contact a lower end of the rearward one of the stoppers 171L. A frontward one of the contact parts 183 is located at a frontward end of the ring 178 and is arranged to contact an upper end of the frontward one of the stoppers 171L.

The second opening 176 is located in a rear end area in the outer cylinder 174. The second opening 176 is formed through a rear end part of the outer cylinder 174 along the front-rear direction. The second opening 176 aligns with the first opening 165 and the inlet 152 along the front-rear direction to overlap one another. Therefore, through the second opening 176, the first opening 165, and the inlet 152, the container cylinder 162 and the developer device 150 are in communication with each other.

The operable lever 175 is located in a frontend area in the switching member 163. As shown in FIG. 9, when the cartridge supporter 79 is in the second position, the operable lever 175 is located outside the inner space of the main body 2. On the other hand, when the cartridge supporter 79 is in the first position, which is not shown, the operable lever 175 is located in the inner space inside the main body 2. The operable lever 175 extends frontward continuously from a frontend part of the outer cylinder 174. The operable lever 175 is formed to have a rectangular bar or pipe longitudinally extending in the widthwise direction.

The switching member 163 is movable from the restrictive position to the releasable position (see FIG. 10) when the operable lever 175 moves upward and the outer cylinder 174 rotates counterclockwise in the rightward view from the left along the outer circumference of the container cylinder 162.

Figure 12C:
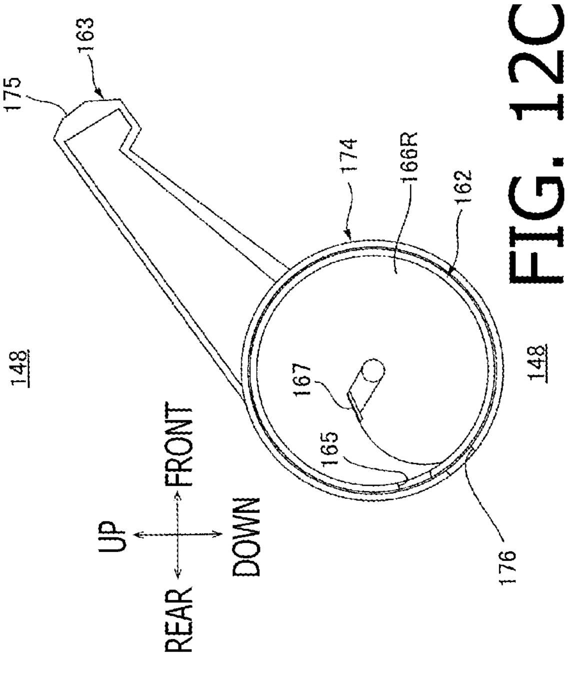
FIGS. 12C and 12D are a cross-sectional view and a side view of the toner cartridge according to the third exemplary embodiment of the present disclosure when the toner cartridge is in the position shown in FIG. 10.
Figure 12D:
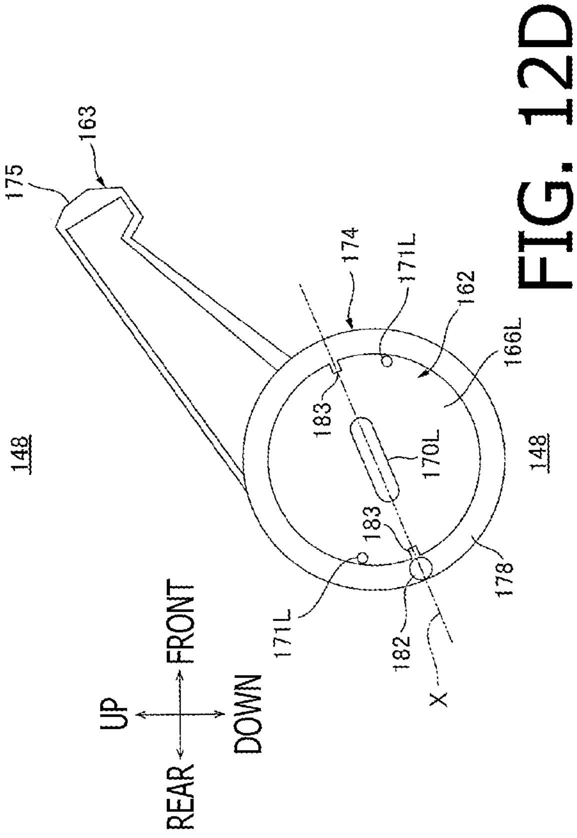

When the switching member 163 is in the releasable position, as shown in FIGS. 12C-12D, the operable lever 175 is arranged to extend upper-frontward from the outer cylinder 174.

Meanwhile, the rearward contact part 183 on the ring 178 is located at a lower position with respect to the rearward stopper 171L, and the frontward contact part 183 on the ring 178 is located at an upper position with respect to the frontward stopper 171L. The second engageable part 182 on the ring 178 is located on the hypothetical line X extending along the longitudinal direction of the boss 170L.

The second opening 176 in the outer cylinder 174 is located to be displaced downward from the first opening 165, and the circumference of the outer cylinder 174 closes the first opening 165.

9-2. Detachment and Attachment of the Toner Cartridge

The toner cartridge 148 may be detached from the drum cartridge 14 when the cover 10 is in the open position, similarly to the cover 10 in the first embodiment.

In conjunction with the cover 10 being moved to the open position, the cartridge supporter 79 moves to the second position.

Figure 10:
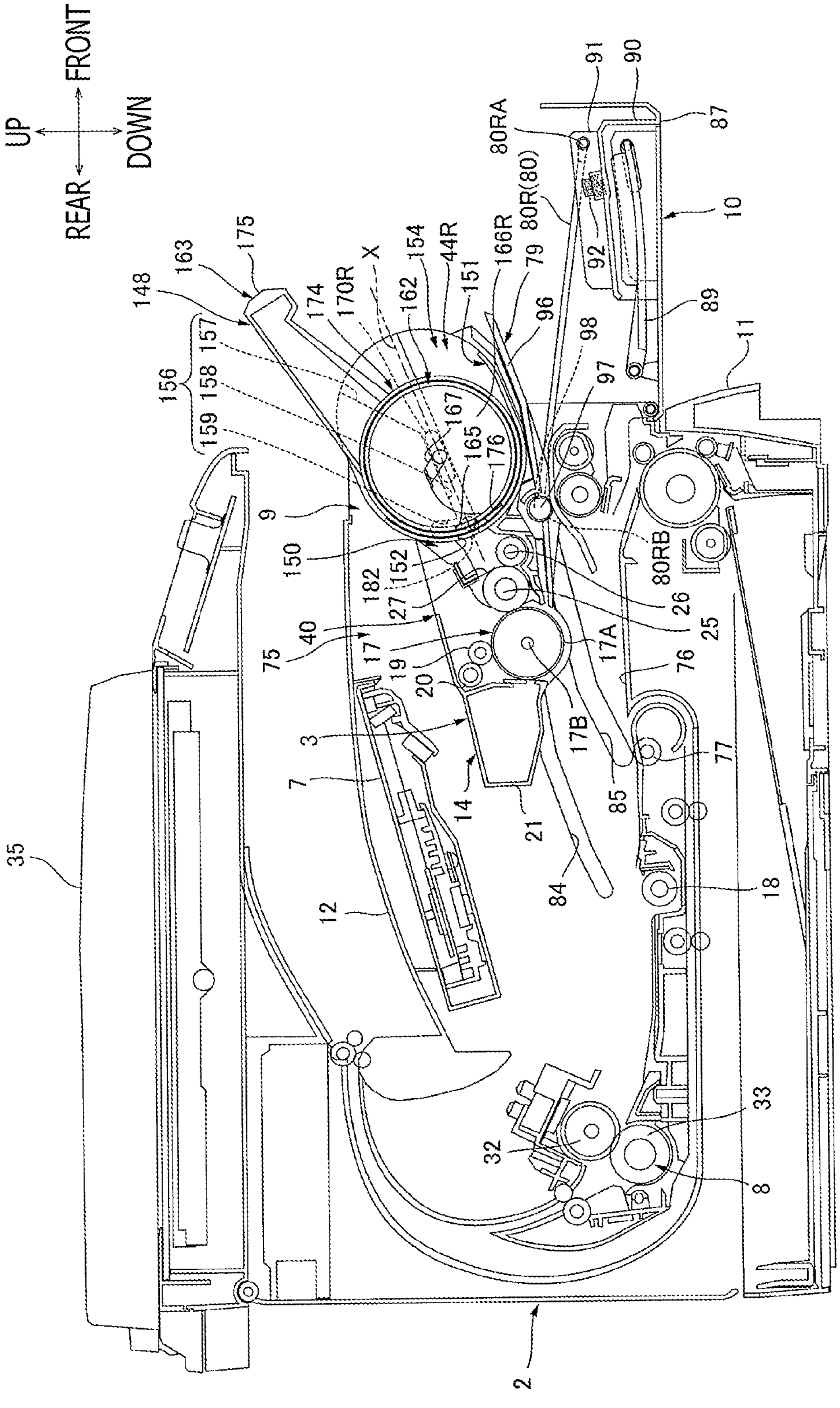
FIG. 10 is an illustrative view of the image forming apparatus, with the cartridge supporter at the second position and the switching member in the toner cartridge at a releasable position, according to a third exemplary embodiment of the present disclosure.

While the drum cartridge 14 is supported on the cartridge supporter 79, as shown in FIG. 10, the user may detach the toner cartridge 148 from the drum cartridge 14.

Specifically, the user may operate the operable lever 175 of the switching member 163 to rotate the outer cylinder 174 counterclockwise in the rightward view from the left.

Thereby, the second engageable part 182 moves to the lower end of the first engageable part 159 to contact the lower end of the narrower section 158. Meanwhile, the second engageable part 182 on the ring 178 is located on the hypothetical line X extending along the longitudinal direction of the boss 170L.

Therefore, the second opening 176 in the outer cylinder 174 is moved downward to be displaced from the first opening 165, and the circumference of the outer cylinder 174 closes the first opening 165.

Thus, the switching member 163 is placed in the releasable position, and the toner cartridge 148 is released from the restriction of the drum cartridge 14 so that the toner cartridge 148 is detachable from the drum cartridge 14.

Next, the user may grip the operable lever 175 of the toner cartridge 148, which is detachable from the drum cartridge 14 to pull the toner cartridge 148 upper-frontward, as shown in FIG. 11. Accordingly, the boss 170L and the second engageable part 182 on the left are guided in the narrower section 158 and the wider section 157, and the boss 170R and the second engageable part 182 on the right are guided in the narrower section 158 and the wider section 157. Thus, the toner cartridge 148 may be detached from the drum cartridge 14.

The toner cartridge 148 may be attached to the drum cartridge 14 supported by the cartridge supporter 79, which is in the second position, as shown in FIG. 10.

Specifically, the second engageable part 182 and the boss 170L on the left are guided in the wider section 157 and the narrower section 158 on the left, and the second engageable part 182 and the boss 170R on the right are guided in the wider section 157 and the narrower section 158 on the right.

Next, the user may operate the operable lever 175 to rotate the outer cylinder 174 clockwise in the rightward view from the left.

Thereby, the switching member 163 is placed in the restrictive position, and the toner cartridge 148 is attached to the drum cartridge 14 so that the toner cartridge 148 is restricted from being detached from the drum cartridge 14.

Thus, attachment of the toner cartridge 148 to the drum cartridge 14 may be completed.

Thereafter, the cover 10 may be placed back in the closing position. In conjunction with the cover 10 being moved to the closing position, the link member 80 may move so that the cartridge supporter 79 may be moved to the first position.

9-3. Benefits by the Third Embodiment (1) According to the image forming apparatus 1 in the third embodiment, as shown in FIGS. 9-10, the outer cylinder 174 is rotatable with respect to the container cylinder 162.

Therefore, engagement and disengagement between the first engageable part 159 in the drum cartridge 14 and the second engageable part 182 in the toner cartridge 148 may be easily switched.

Further, connection and disconnection between the first opening 165 in the container cylinder 162 and the second opening 176 in the outer cylinder 174 may be easily switched.

(2) According to the image forming apparatus 1 in the third embodiment, as shown in FIG. 9, engagement between the first engageable part 159 and the second engageable part 182 may be easily achieved by the uncomplicated structure of the concave-and-convex form.

(3) According to the image forming apparatus 1 in the third embodiment, as shown in FIG. 9, the operable lever 175 may be placed outside the main body 2 when the cover 10 is open; therefore, the user may reach the operable lever 175 and move the operable lever 175 easily.

10. MORE EXAMPLES

Although examples of carrying out the present disclosure have been described, those skilled in the art may recognize that there are numerous variations and permutations of the image forming apparatus that fall within the spirit and scope of the invention as set forth in the appended claims. It may be understood that the subject matter defined in the appended claims is not necessarily limited to the specific features or act described above. Rather, the specific features and acts described above are disclosed as example forms of implementing the claims. In the meantime, the terms used to represent the components in the above embodiment may not necessarily agree identically with the terms recited in the appended claims, but the terms used in the above embodiment may merely be regarded as examples of the claimed subject matters.

For example, the switching member 41 described in the first and second embodiments may not necessarily be provided as a part of the drum cartridge 14 but may be provided as a part of the developer cartridge 15.

For another example, the first conveyer roller 77 in the first, second, and third embodiments may not necessarily be arranged on the first guide 76 but may be arranged at a position spaced apart from the first guide 76.

For another example, the projection 98 in the first, second, and third embodiments may not necessarily be formed on the widthwise end of the second conveyer roller 97 as a part of the second conveyer roller 97 but may be, for example, formed integrally with a side wall of the cartridge supporter 79 to project from the side wall in the widthwise direction.

For another example, the second ends 80RB, 80LB of the link member 80 may not necessarily be formed in the cylindrical shape to hold the projections 98 of the cartridge supporter 79 therein but may be formed in a shape of a C to engage with the projections 98. In this form, the projections 98 in the cartridge supporter 79 may be fitted in the grooves 85 in the side walls 75 without the intervention by the second ends 80RB, 80LB of the link member 80.

For another example, the toner cartridge 148 in the third embodiment may not necessarily be guided by the recesses 156 in the drum frame 40 to the drum cartridge 14 but may be guided by, for example, projections or rails that may guide the toner cartridge 148 to be attached to or detached from the drum cartridge 14.

For another example, the first engageable part 159 in the recess 156 in the third embodiment may not necessarily be in the concave form but may be formed in a convex form to project, and the second engageable part 182 in the toner cartridge 148 may not be formed to project in the convex form but may be in a concave form.

What is claimed is:

1. An image forming apparatus, comprising a process cartridge including a photosensitive member;

a main body having an opening, through which the process cartridge is configured to pass, the opening being located on one side of the main body;

a sheet cassette configured to store a sheet, onto which toner is to be transferred from the photosensitive member, the sheet cassette being detachably attached to the main body; and a fuser configured to thermally fix the toner transferred from the photosensitive member to the sheet thereon, the fuser being located inside the main body apart from the opening, wherein the main body includes a supporter configured to support the process cartridge thereon, the supporter being movable between a first position, at which the process cartridge supported by the supporter is located inside the main body, and a second position, at which the process cartridge supported by the supporter protrudes at least partly through the opening outside the main body, wherein the supporter includes a sheet guide in a plate-like shape configured to guide the sheet fed from the sheet cassette and a roller configured to contact the sheet fed from the sheet cassette, wherein, when the supporter supporting the process cartridge thereon is located at the first position, the roller, the photosensitive member, and the fuser are arranged in this given order along a direction from the opening toward the fuser, and wherein the sheet guide is at least partly located farther than the roller from the fuser along the direction from the opening toward the fuser.

2. The image forming apparatus according to claim 1, wherein the supporter is configured to support the process cartridge such that, when the supporter supporting the process cartridge thereon is located at the second position, at least a part of the photosensitive member is located closer to the fuser than to the opening.

3. The image forming apparatus according to claim 2, wherein the supporter is configured to support the process cartridge such that, when the supporter supporting the process cartridge thereon is located at the second position, an entirety of the photosensitive member is located closer to the fuser than to the opening.

4. The image forming apparatus according to claim 1, wherein a direction in which the supporter moves from the second position to the first position is the direction from the opening toward the fuser.

5. The image forming apparatus according to claim 1, wherein the supporter has a transfer roller, the transfer roller being located to face the photosensitive member when the supporter supports the process cartridge thereon, the transfer roller being configured to transfer a toner image formed on the photosensitive member to the sheet.

6. The image forming apparatus according to claim 1, wherein the main body has a conveyer roller, the conveyer roller being configured to face the roller and convey the sheet in conjunction with the roller when the supporter supporting the process cartridge thereon is located at the first position, the conveyer roller being separated from the roller when the supporter supporting the process cartridge thereon is located at the second position.

7. The image forming apparatus according to claim 1, wherein the main body has a guide, the guide being located closer to the sheet guide when the supporter is located at the first position, the guide being located farther from the sheet guide when the supporter is located at the second position, the guide being configured to guide the sheet fed from the sheet cassette alongside the sheet guide.

8. The image forming apparatus according to claim 1, wherein an attaching direction to attach the sheet cassette to the main body is the direction from the opening toward the fuser.

9. The image forming apparatus according to claim 1, wherein the main body has a cover, the cover being movable between a closing position, at which the cover closes the opening, and an open position, at which the opening is exposed, and the sheet cassette is detachable from and attachable to the main body at a position below the cover.

10. An image forming apparatus, comprising a process cartridge including a photosensitive member;

a main body having an opening, through which the process cartridge is configured to pass, the opening being located on one side of the main body;

a sheet cassette configured to store a sheet, onto which toner is to be transferred from the photosensitive member, the sheet cassette being detachably attached to the main body; and a fuser configured to thermally fix the toner transferred from the photosensitive member to the sheet thereon, the fuser being located inside the main body apart from the opening, wherein the main body includes a supporter configured to support the process cartridge thereon, the supporter being movable between a first position, at which the process cartridge supported by the supporter is located inside the main body, and a second position, at which the process cartridge supported by the supporter protrudes at least partly through the opening outside the main body, wherein the supporter includes a sheet guide configured to guide the sheet fed from the sheet cassette and a roller configured to contact the sheet fed from the sheet cassette, and wherein, when the supporter supporting the process cartridge thereon is located at the first position, the roller, the photosensitive member, and the fuser are arranged in this given order along a direction from the opening toward the fuser, and wherein the supporter has a transfer roller, the transfer roller being located to face the photosensitive member when the supporter supports the process cartridge thereon, the transfer roller being configured to transfer a toner image formed on the photosensitive member to the sheet.

* * * * *